*(12)* United States Patent
Seward et al.

(10) Patent No.: US 6,543,206 B2
(45) Date of Patent: *Apr. 8, 2003*

(54) APPARATUS AND METHOD FOR FORMATION OF SEALED PACKAGES

(75) Inventors: David Robert Seward, Coventry (GB);
Michael John Cahill, Coventry (GB);
Adrian Mark Hinkley, Coventry (GB);
Roderick Leslie Mitchell, Warwickshire (GB)

(73) Assignee: Molins Plc, Milton Keynes (GB)

( * ) Notice: Subject to any disclaimer, the term of this patent is extended or adjusted under 35 U.S.C. 154(b) by 36 days.

This patent is subject to a terminal disclaimer.

(21) Appl. No.: 09/801,078

(22) Filed: Mar. 6, 2001

(65) Prior Publication Data

US 2002/0023411 A1 Feb. 28, 2002

Related U.S. Application Data

(63) Continuation of application No. 09/269,036, filed as application No. PCT/GB97/02397 on Sep. 5, 1997, now Pat. No. 6,343,459.

(30) Foreign Application Priority Data

Sep. 17, 1996 (EP) ............................................. 96306749
Nov. 21, 1996 (EP) ............................................. 96308412

(51) Int. Cl.[7] ............................................. B65B 31/06
(52) U.S. Cl. ............................. 53/434; 53/512; 53/437; 53/525; 53/469; 53/284.7; 53/480; 53/370.6
(58) Field of Search ....................... 53/434, 512, 370.6, 53/371.8, 371.9, 372.2, 437, 469, 480, 525, 284.7

(56) References Cited

U.S. PATENT DOCUMENTS

| 2,559,368 | A | * | 7/1951 | Pancratz | |
|---|---|---|---|---|---|
| 2,749,686 | A | * | 6/1956 | Lorenz et al. | |
| 2,928,216 | A | * | 3/1960 | Orsini | |
| 3,078,633 | A | * | 2/1963 | Stromberg et al. | |
| 3,220,161 | A | * | 11/1965 | Lohse et al. | |
| 3,518,809 | A | * | 7/1970 | Ott | |
| 3,939,624 | A | * | 2/1976 | Gidewall et al. | 53/512 |
| 4,241,558 | A | * | 12/1980 | Gidewall et al. | 53/512 |
| 5,711,136 | A | * | 1/1998 | Carcano | 53/434 |
| 5,737,906 | A | * | 4/1998 | Ishimaru | 53/512 |
| 6,343,459 | B1 | * | 2/2002 | Seaward et al. | 53/434 |

FOREIGN PATENT DOCUMENTS

| EP | 0046592 A2 | * | 3/1982 | 53/512 |
|---|---|---|---|---|
| GB | 764796 | * | 1/1957 | 53/434 |

* cited by examiner

*Primary Examiner*—Stephen F. Gerrity
(74) *Attorney, Agent, or Firm*—Jensen & Puntigam, P.S.

(57) ABSTRACT

An apparatus and method for evacuating and sealing a bag made of a sealable material and containing a comminuted product. The bag is positioned with its open upper end around a sleeve through which a hollow probe can be extended. A pair of upper jaw members close to form an outer temporary seal above an intermediate region of the bag above the level of the surface of the charge in the bag where a permanent seal is to be formed. A pair of lower jaws members close to form an inner temporary seal about a lower region of the bag above the surface of the charge. With the probe extended through the sleeve into the bag, the bag is evacuated through the probe. After evacuation is completed and after withdrawal of the hollow probe, a pair of sealing members close against the intermediate region of the bag in order to form a permanent seal for the bag.

20 Claims, 12 Drawing Sheets

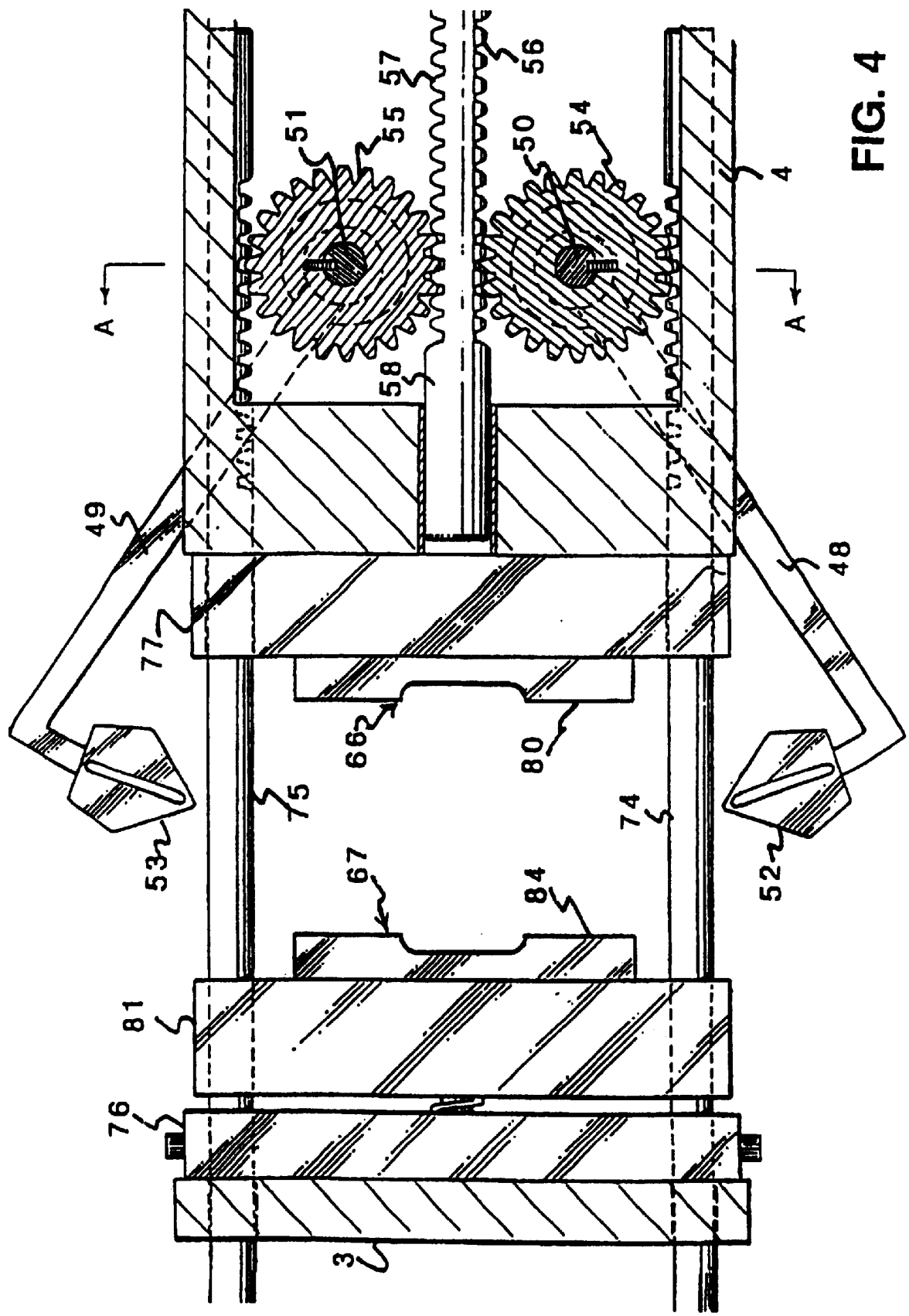

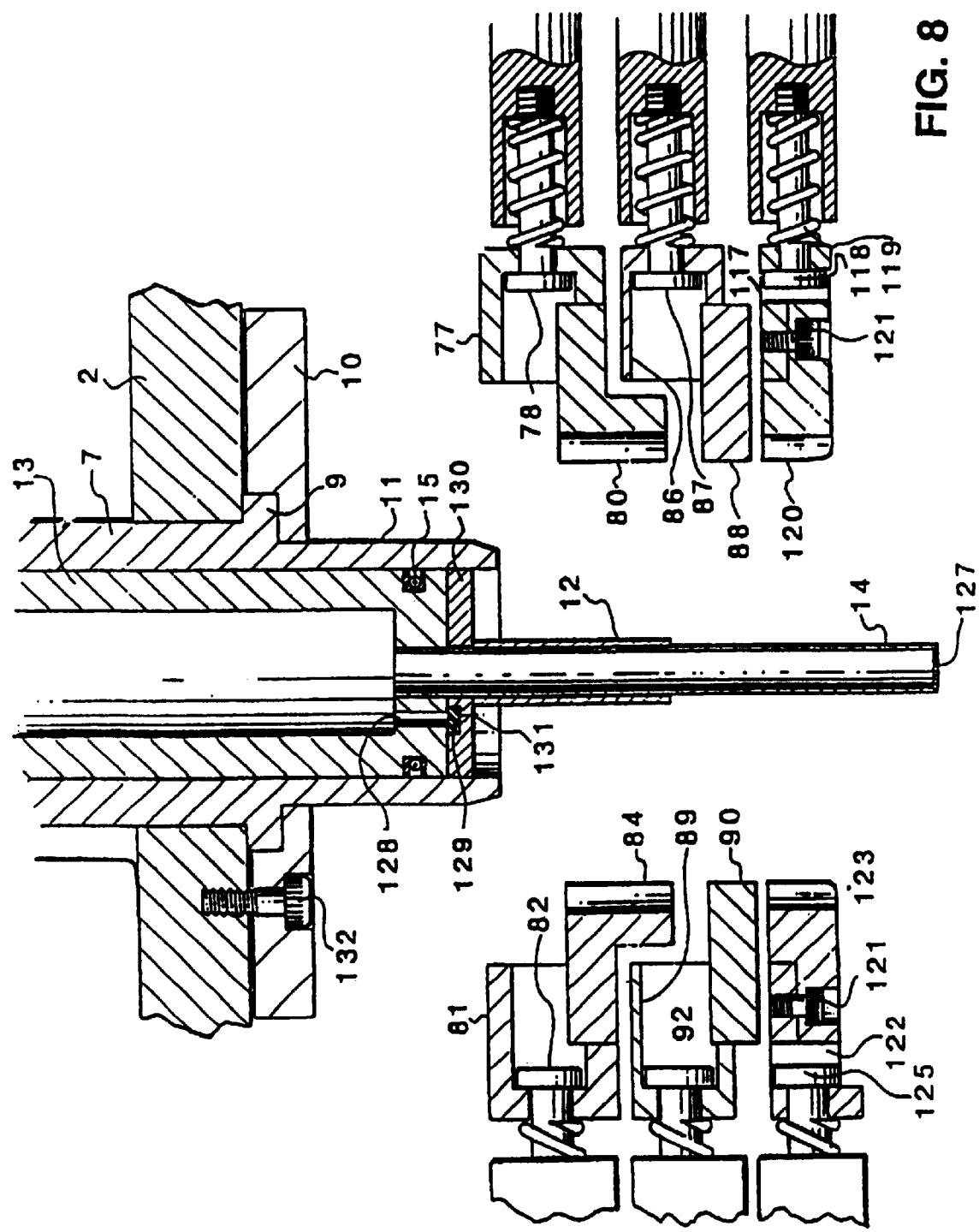

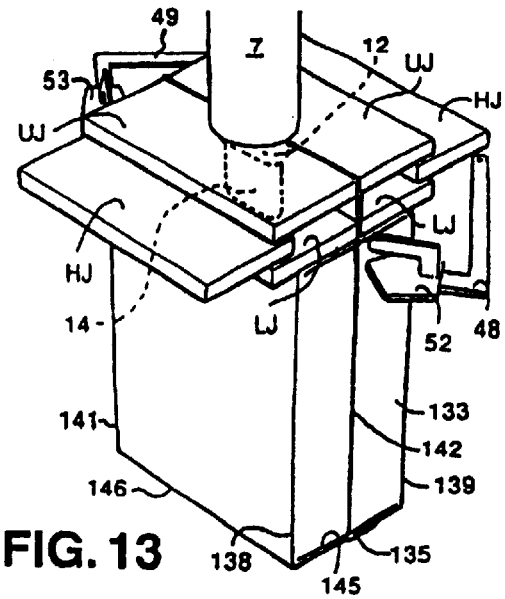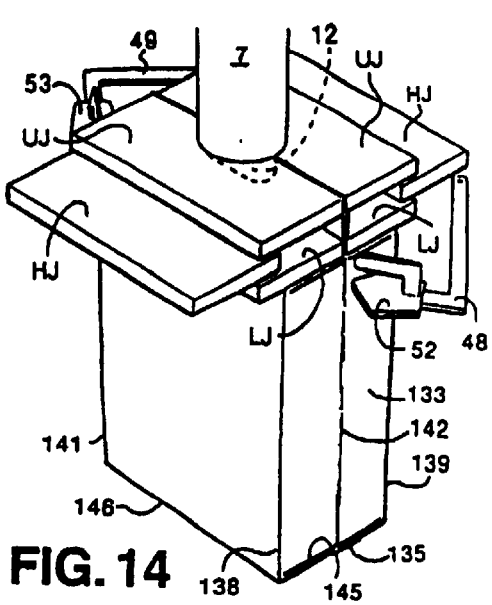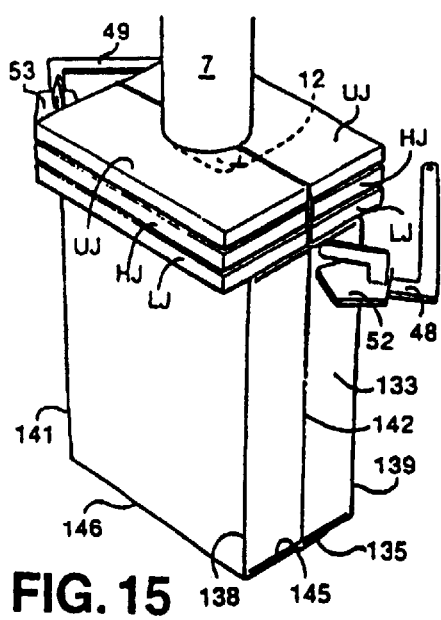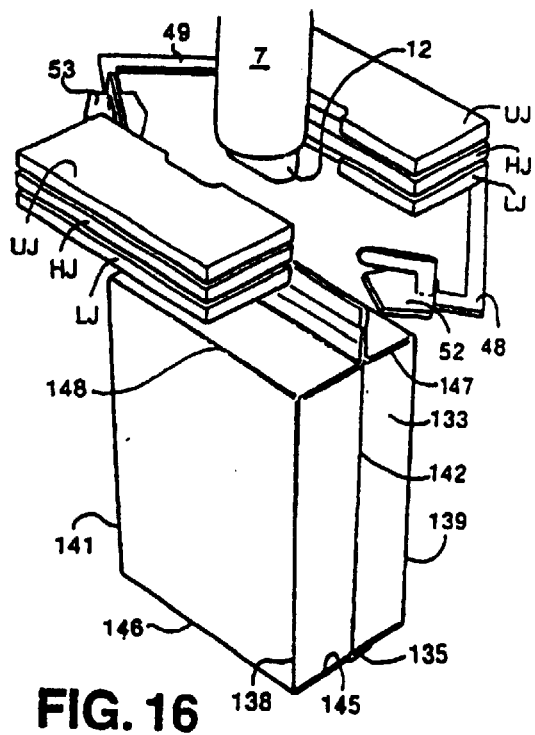

APPARATUS AND METHOD FOR FORMATION OF SEALED PACKAGES

This application is continuation of U.S. patent application Ser. No. 09/269,036, filed Aug. 20, 1999 claiming the priority of International Application PCT/GB97/02397 filed Sep. 5, 1997, now U.S. Pat. No. 6,343,459 B1.

This invention relates to the formation of sealed packages, more particularly sealed packages containing a charge of a flowable product, for example a comminuted product, such as roasted and ground coffee, and formed from a sealable material.

Comminuted products, such as roasted and ground coffee, tea or instant coffee, are often sold in tins or in packages in the form of sealed bags made of a sealable plastics material. Such a sealable material may be heat sealable or pressure sensitive material (or a so-called cold seal material). The sealable material may include a barrier layer of aluminium foil. In some countries the product is generally packed in such sealed bags at atmospheric pressure; in others it is more usual for the product to be packed under vacuum so that the packaging material conforms closely to the product. This has the benefit that the product is protected from the effects of oxygen and the environment and also that the package, which typically has a rectangular parallelepipedal shape somewhat similar to a brick, takes up less space than a package that has been packed at atmospheric pressure.

Currently used technology involves placing the filled bags in turn into a bell chamber followed by evacuating the chamber and the bag before sealing the top of the bag within the bell chamber. This arrangement typically requires 12 seconds and 30 kW of pump power for bags containing 250 g to 1000 g (e.g. 500 g) of roast and ground coffee in order to evacuate the bags at a rate of 100 bags per minute. Hence the system is relatively slow and has high energy requirements.

Other flowable materials which can be mentioned include sugar, flour, potato crisps, rice grains or flakes, and the like and liquids such as paint and soup.

FR-A-2560857 teaches a machine for filling sealed coffee bags which has a turntable with a drive underneath. Chambers around the periphery of the turntable each contain a vertically supported filled coffee bag. Each chamber is connected to a tube partly under the turntable. A throttling valve arrangement is provided with a channel which ends at a vertical tube communicating with a vacuum pump and to the atmosphere. A valve member is rotated by a radial arm which has a head that is held by a spring against a cam track acting as the turntable rotates. Connection with vacuum and with the atmosphere is achieved by means of a control disc, having a ring of holes, and slots. This arrangement is said to prevent escape of coffee powder.

In U.S. Pat. No. 4,730,439 there is disclosed a method of formation of vacuum sealed packets. In this method open topped packets are formed and filled, whereupon a vacuum tube is inserted in the top of the packet and then the side walls are urged around the vacuum tube in order to cause a temporary vacuum in the packet while the side walls are sealed together below the vacuum tube.

Use of a vacuum packer is described in FR-A-2488215; this nearly seals the packages by welding along the top edge or a side as air is drawn out by a probe which is extracted before final sealing. Sealing is effected by moving the package across a fixed welding head. The probe can be progressively retracted after the beginning of evacuation and before the final closure welding.

In GB-A-1474838 there is described an apparatus for evacuating a fluid from an open-ended flexible, thermosealable bag which comprises a bag holding member arranged to be inserted into the open end of the bag and to fit snugly against the inner surfaces thereof. This member has a plurality of openings in it connected to a vacuum source. A probe with a passage connected to a vacuum source is supported by the member and can be extended into and retracted from the bag. Sealing is effected after the probe is withdrawn from the bag.

GB-A-1416101 teaches use of a suction pipe for sucking gas out of a container containing a pulverulent or granular material. This pipe has a free end with a plurality of apertures separated by elastically deformable tongues effective to close the free end of the pipe by mutual engagement.

U.S. Pat. No. 3,796,020 discloses a hand operated machine for evacuating and sealing a bag.

In U.S. Pat. No. 3,589,098 an arrangement of cams is used to move a bag-evacuating nozzle, to move a pressure bar for applying pressure to the bag, to vary the length of the heater period, and to control the length of the sealing period.

GB-A-1199580 shows use of a hollow needle to evacuate a bag; this needle is then withdrawn before sealing bars close to seal the bag and a knife severs the evacuated bag.

U.S. Pat. No. 2,634,562 and its divisional, U.S. Pat. No. 2,692,074 teach a hand operated machine in which packages are sealed except at an ear. The plies of the bag are held apart by applying vacuum to the outer surfaces and provide an opening through which the package can be evacuated before it is finally sealed.

A bag evacuating and closing apparatus with two opposed jaws which encompass a top closure of a bag to be sealed and which have hollow spaces is taught in U.S. Pat. No. 5,097,648. A sealing rib protrudes from one face end of one of two frames which surround the jaws. This sealing rib is interrupted in a middle region of the frame part at which the closure fold protrudes between the jaws. Suction openings in this region allow the walls of the top closure to be pulled tightly against the frame parts, whereupon air is sucked out of the bag which is then sealed by the sealing jaws.

A method and apparatus for producing a vacuum package filled with granular material are described in EP-A-0626312. A package filled with granular product is compressed by applying pressure to the side walls of the package so that the granular product forms a compact whole. Then the compressed package is evacuated through a small suction opening by means of a vacuum element comprising a needle. Thereafter the package is sealed with the aid of a separate sealing strip, which is placed inside the bag before filling, by pressing a heated sealing jaw against the wall in the region of the sealing strip, the compressed granular material providing support during this step for the sealing strip.

EP-A-0634324 discloses an apparatus for filling with an inert gas the head space of a tub which is closed by a lid.

In EP-A-0685391 there is disclosed a machine for forming-filling packaging bags, with provision for evacuating the filled bags, in the form of a sealed or tight bell.

For the sake of appearance it is desirable that, when the flowable material is a comminuted material such as roasted and ground coffee, the sealed package shall have as regular a shape as possible, most usually in the shape of a rectangular parallelepiped. It is, however, difficult to achieve reliably a truly rectangular parallelepipedal shape. This is because the packaging material tends to crinkle as the air is drawn out of the package and as the packaging material conforms to the outside of the parallelepipedal brick of coffee or other comminuted product. In addition there is the problem that, if any of the comminuted product is disturbed significantly during the evacuation step, it can become displaced into the seal area and result in formation of a faulty seal. There is also a danger that the roasted and ground coffee or other comminuted product can get drawn into the vacuum system.

Prior art methods and apparatus for forming sealed evacuated packages of comminuted products such as coffee are relatively slow in operation. However, although higher speeds are theoretically possible by enlarging the machinery, the size of the resulting machines becomes unmanageable for machines capable of operating at speeds above about 150 bags per minute.

It would be desirable to provide an apparatus for forming evacuated packages of flowable products, such as comminuted products, which is capable of operating reliably at significantly higher operating speeds than the current practical limit of about 150 bags per minute.

Accordingly there is a need in the art for a novel method, and an apparatus for use of such a method, of evacuating and sealing packages using bags made of a sealable material and containing a charge of a flowable product, such as a comminuted product, which can be operated at significantly higher speeds than have been achievable heretofore. There is also a need for a high speed method and apparatus for forming evacuated sealed packages containing roasted and ground coffee or another comminuted material which reliably gives a package with a pleasing finish substantially free from disfiguring creases and other blemishes.

The invention seeks to provide an improved method, and an apparatus of readily manageable size for use of such a method, of evacuating and sealing packages using bags made of a sealable material and containing a charge of a flowable product, such as a comminuted product, which can be operated at significantly higher speeds and lower power than have been achievable heretofore. It further seeks to provide a high speed method and apparatus for forming such packages which reliably gives an evacuated and sealed package containing a comminuted product with a pleasing finish substantially free from disfiguring creases and other blemishes.

According to one aspect of the present invention there is provided a method of evacuating and sealing a bag containing a charge of a flowable product and formed from a sealable material so as to form a sealed package, comprising the steps of:

(i) positioning a bag containing a charge of a flowable product and formed from a sealable material with its open end around a vacuum probe member and with said member extending into the bag to a first position;

(ii) forming a temporary seal at the open end of the bag around the probe member;

(iii) evacuating the bag through the probe member so as to produce a first pressure in the bag;

(iv) causing relative movement of the bag and said probe member so that said probe member is retracted relative to the bag and extends into the bag to a second position;

(v) forming a permanent seal in the bag at the open end of the bag in a position between the charge and the probe member in said second position;

(vi) subsequent to step (ii) but prior to completion of step (v) maintaining a predetermined pressure in said probe member which is higher than said first pressure so that gas flows from said probe member into said bag; and (vii) releasing the temporary seal to allow release of the bag following completion of the permanent seal.

In such a method it is preferred that said temporary seal is formed by pressing elements which overlap the extremity of the opposed surfaces at the open end of the bag, so that said elements press said opposed surfaces against each other and around the probe member and seal against each other beyond said extremity. The probe member may include a stationary part around which said temporary seal is formed, and a movable part which extends from said stationary part when the probe member is in said first position and is substantially retracted when the probe is in said second position.

The invention also envisages that, in a preferred method, said temporary seal forming step includes forming a further temporary seal at the open end of the bag around said probe member in said first position, said further temporary seal being positioned between the charge and the position of the permanent seal and being maintained until after completion of the permanent seal.

Particularly when the flowable material is a comminuted solid material a charge of which can retain a solid shape in an evacuated package, the temporary seal forming step preferably includes pressing jaw members against the bag, including the step of causing relative movement of the bag and said jaw members after said further temporary seal has been formed and prior to completion of the permanent seal, so as to cause the adjacent surface of the charge to be pressed into a desired shape by the bag material adjacent that held between said jaws.

The probe member may extend in said first position to a position closely adjacent the surface of said charge. It is further preferred that the pressure in said probe member is maintained at a reduced value up to completion of said permanent seal, whereby ambient pressure acting on the outer part of said bag in the region of said probe member in said second position assists in maintaining the bag sealed.

The invention further provides a method of evacuating and sealing a bag containing a charge of a flowable product and formed from a sealable material so as to form a sealed package, comprising the steps of:

(i) positioning a bag containing a charge of a flowable product and formed from a sealable material with its open end around a vacuum probe member and with said member extending into the bag to a first position;

(ii) forming outer and inner spaced temporary seals at the open end of the bag and around said probe member in said first position;

(iii) evacuating the bag through the probe member;

(iv) causing relative movement of the bag and said probe member so that said probe member is retracted relative to the bag and extends into the bag to a second position in which said member extends through said outer temporary seal but not through said inner temporary seal;

(v) forming a permanent seal in the bag at the open end of the bag at an intermediate region between said outer and inner temporary seals and between the charge and the probe member in said second position; and (vi) releasing the outer and inner temporary seals to allow release of the bag following completion of the permanent seal.

Also provided in accordance with the invention is a method of evacuating and sealing a bag containing a charge of a flowable product and formed from a sealable material so as to form a sealed package, comprising the steps of:

(i) positioning a bag containing a charge of a flowable product and formed from a sealable material with its open end around a vacuum probe member and with said member extending into the bag to a first position;

(ii) forming an outer temporary seal at the open end of the bag around said probe member;

(iii) pressing jaw members against the bag so as to form an inner temporary seal at the open end of the bag around said probe member in said first position, said further temporary inner seal being positioned between the charge and the outer temporary seal and spaced from the outer temporary seal;

(iv) causing relative movement of the bag and the jaw members after said inner temporary seal has been formed so as to cause the adjacent surface of the charge to be pressed into a desired shape by impingement of the bag material adjacent that held between the jaw members against the jaw members;

(v) evacuating the bag through the probe member;

(vi) prior to or subsequent to completion of step (iv) causing relative movement of the bag and said probe member so that said probe member is retracted relative to the bag and extends into the bag to a second position while maintaining the outer and inner temporary seals; and (vii) forming a permanent seal at the open end of the bag in a position between the inner and outer temporary seals and between the surface of the charge and the probe member in its second position.

The jaw members can in this last mentioned case have flat surfaces against which the adjacent surface of the charge is pressed by impingement of the bag material adjacent that held between the jaw members against the jaw members so as to assist in forming a squared sealed end to the sealed bag.

In yet another aspect of the invention there is provided a method of evacuating and sealing a bag containing a charge of a flowable product and formed from a sealable material so as to form a sealed package, the method comprising the steps of:

(A) positioning a bag containing a charge of a flowable product and formed from a sealable material with its open upper end around a substantially vertical sleeve of an evacuation and sealing head assembly, the evacuation and sealing head assembly further comprising a substantially vertically retractable vacuum probe for evacuating the upper end of the bag above the charge, the vacuum probe being movable between an extended position in which its lower end extends below a lower end of the sleeve and a retracted position, a pair of upper jaw members movable towards each other to a closed position in which portions of the upper jaw members grip an upper extremity of the bag against the sleeve to form an outer temporary seal and movable away from each other to an open position to release the upper extremity of the bag, a pair of lower jaw members below the upper jaw members and movable towards each other to a closed position in which portions of the lower jaw members grip a lower region of the bag against the vacuum probe in its extended position to form an inner temporary seal, the lower region being below the upper extremity of the bag and above the charge in the bag, and movable away from each other to an open position to release the lower region of the bag, and a pair of sealing members movable towards each other, following retraction of the vacuum probe to its retracted position, to a closed sealing position in which the sealing members contact the outside of an intermediate region of the upper end of the bag extending across the entire width of the bag below its upper extremity and above the lower region to form a seal extending across the intermediate region thereby to seal the bag so as to form a package and movable away from each other to an open position to release the sealed package;

(B) evacuating the bag through the vacuum probe with the vacuum probe extended to its extended position through the sleeve into the bag into the space above the charge, with the upper jaw members closed against the sleeve to grip the upper extremity of the bag against the sleeve and form an outer temporary seal, and with the lower jaw members closed to grip the lower region of the bag against the probe and form an inner temporary seal;

(C) retracting the vacuum probe from its extended position to its retracted position whilst maintaining reduced pressure in the vacuum probe;

(D) moving the sealing members to their closed positions to cause the sealing members to contact the outside of the intermediate region of the upper end of the bag to effect formation of a permanent seal and to form a package;

(E) retracting the sealing members while maintaining the upper and lower jaw members in their respective closed positions; and (F) moving the upper and lower jaw members each to their respective open positions to release the now sealed package from the evacuation and sealing head assembly.

In contrast to the currently used commercial method which involves the use of a bell chamber, the method of the invention involves insertion of a hollow probe inside the bag so that essentially only air trapped in the bag requires to be removed. It has been found that evacuation can be achieved in approximately 3 seconds for a bag containing 500 g of roast and ground coffee under appropriate operating conditions. Moreover the pump power is considerably reduced compared with the prior art process, the power requirement for evacuating such bags at a rate of 300 bags per minute being between about 1 kW and about 2 kW.

The sealable material from which the bag is formed may comprise a pressure sensitive (or cold seal) material; in this case formation of a seal can be accomplished in step (D) by applying pressure alone during contact of the sealing members with the outside of the intermediate region of the upper end of the bag. Such pressure sensitive materials are well known to those skilled in the art. Alternatively, and more usually, the sealable material may comprise a heat sealable material. Normally the sealable material will comprise a laminate sheet material including a sealable layer and the bag is formed so that the layer of sealable material is on the inside of the bag.

When using a heat sealable material the sealable material will normally be chosen so as to have a softening point, at which it can bond to a similar softened layer, that is lower than the melting point of the other layer or layers of the bag. In this case formation of a seal in step (D) can be accomplished by supplying heat to the sealing members by means of internal electrical heating elements so as to maintain the sealing members at a temperature above the softening point of the sealable layer but below the melting point of any other layer of the laminate and by pressing the heated sealing members into contact with the outside of the intermediate region of the upper end of the bag with a pressure and for a time sufficient to cause formation of a heat seal thereby to form a package. This time will depend upon such factors as the thickness and thermal conductivity of the heat sealable material and is sufficiently long to soften the internal surfaces of the bag in the seal area enough to form a seal but not so long as to melt any other layer of the heat sealable material. As an example of a suitable heat sealable material there can be mentioned a laminate of reverse printed polyethylene terephthalate, low density polyethylene and peelable low density polyethylene. Such a laminate can be, for example, from about 75 µm to about 150 µm thick, e.g. about 100 µm thick. Other heat sealable materials available in web form are well known to those skilled in the art, including laminate materials including a thin metallic layer.

In a particularly preferred form the bag has a rectangular base, a pair of opposed longer walls, which form a front wall and a back wall to the bag, and a pair of shorter side walls. In this case the completed package has essentially the shape of a rectangular parallelepiped.

Conveniently the bag is formed from a web of heat sealable sheet material which is first formed into a tube with a longitudinal seal, conveniently a longitudinal fin seal, by sealing together longitudinal edge portions of the web. In addition to the longitudinal seal the bag also has a transverse bottom fin seal; when the bag is to form a substantially parallelepipedal package the bottom fin seal may be gusseted. The individual bag lengths are severed from the web after formation of the longitudinal fin seal and prior to filling.

In the method of the invention the bag is preferably supported in an open topped container whose internal dimensions correspond generally to the outside dimensions and cross section of the package. Preferably the bag is inserted into such an open topped container prior to filling with the charge of comminuted or other flowable material. The bag may in this case be inserted in flat form into the open topped container and opened out, prior to filling, while it is in the open topped container. Preferably the bag, after filling with a charge of comminuted or other flowable material, is subjected to vibration or tamping, or both, in order to compact the comminuted or other flowable material prior to evacuation and sealing and to assist in importing a smooth top surface to the charge in the bag.

When the package is to have a substantially parallelepipedal shape, the open topped container is also substantially parallelepipedal and accordingly encloses the bag on five sides leaving only the top surface open.

In the method of the invention it is preferred that, in step (A), the upper jaw members are initially in their open position and that the upper jaw members commence to move towards their closed position prior to initiation of step (B). Preferably the upper jaw members reach their closed position prior to commencement of evacuation.

The upper jaw members are preferably provided with resilient pads on their mutually inner faces. Typically such resilient pads measure about 20 mm to about 30 mm (e.g. about 25 mm) from top to bottom of their mutually contacting surfaces. In step (A), the bag-is preferably positioned so that its upper rim lies a little below, e.g. from about 10 mm to about 15 mm below, e.g. about 12.5 mm below, the top of the resilient pads on the upper jaw members. Thus, when the upper jaw members close to form an upper temporary seal, the upper portions of the resilient pads contact one another and the outside of the sleeve and provide an air-tight seal above the upper rim of the bag prior to commencement of evacuation.

When the package is to have a substantially parallelepipedal shape, the evacuation and sealing head assembly may further include a pair of gusset-forming members movable, in a direction substantially at right angles to the direction of movement of the upper jaw members, between an open position and a closed position in which the gusset-forming members contact the outside surfaces of the bag and form gussets in the bag; in the method of the invention the gusset-forming members are preferably initially in their open position and move towards their closed position as the upper jaw members move towards their closed position, and then the gusset-forming members are moved to their open position before the commencement of step (D). It is convenient if the gusset-forming members are mounted on pivotally mounted arms for arcuate movement about a substantially vertical axis between their open and closed positions. Such gusset-forming members are arranged to form gussets near the top end of the bag just below the intermediate region where the seal is to be formed.

In step (A) the bag is preferably so positioned vertically with respect to the lower end of the sleeve that the upper surface of the charge of flowable product in the bag lies at a first distance below the lower end of the sleeve corresponding to a position in which the upper surface of the charge of comminuted or other flowable product in the bag also lies below the lower end of the hollow probe in its extended position and, prior to commencement of step (B), the bag is raised to a raised position in which the upper surface of the charge of comminuted or other flowable product in the bag lies at a second distance below the lower end of the sleeve, the raised position being a position such that, when the hollow probe is moved to its extended position, the upper surface of the charge in the bag is in close proximity to the lower end of the hollow probe. Preferably in the raised position of the open topped container the upper surface of the charge of comminuted or other flowable product in the bag lies at a second distance below the bottom of the sleeve corresponding to a third distance of less than about 1 cm below, for example less than about 1 mm to about 2 mm below, the lower end of the hollow probe in its extended position. Preferably in the raised position of the bag the upper surface of the charge of comminuted or other flowable product in the bag will just contact the lower end of the hollow probe in its extended position. Furthermore, particularly when the flowable material is a comminuted product such as roasted and ground coffee, the lower jaw members are preferably so designed that, in its raised position and with the lower jaw members closed, the upper surface of the charge of comminuted or other flowable material in the bag presses the material of the bag against the underside of the lower jaw members. In this way the coffee or other comminuted product is prevented from lifting due to efflux of air as the vacuum is applied to the inside of the bag and, in addition, the appearance and squareness of the top of the bag are improved.

In step (A) the lower jaw members are preferably initially in their open position and are moved to their closed position prior to commencement of step (B). It is further preferred that the lower jaw members reach their closed position after the upper jaw members reach their closed position and even more preferred that they reach this closed position before evacuation commences. The lower jaw members may be provided on their mutually facing surfaces with resilient pads which engage the lower region of the bag in their closed position and resiliently press the inner surfaces of the lower region of the bag against the hollow probe to form an inner temporary seal, while permitting withdrawal of the probe from its extended position to its retracted position prior to commencement of step (D).

It will usually be preferred for the hollow probe to be moved from its retracted position to its extended position prior to the lower jaw members reaching their closed position.

The end of the hollow probe is preferably provided with a protective filter, gauze or perforated sheet to hinder passage of particles of comminuted or other flowable product up the interior of the hollow probe and in step (B) vacuum is preferably applied through the hollow probe for a period sufficient to reduce the pressure inside the bag to a first reduced pressure and then a predetermined small quantity of a medium selected from air, carbon dioxide, nitrogen, desirable aromas, and mixtures thereof is introduced into the bag thereby to dislodge particles of comminuted or other flowable product from the filter, gauze or perforated sheet back into the bag and raise the pressure somewhat to a second reduced pressure. Besides helping to keep the end of the hollow probe clean, this variation of the method of the invention can be used to impart desirable characteristics to the sealed package, including the ability to release a desirable enhanced aroma of, for example, roasted and ground coffee when the package contains roasted and ground coffee. Thus, for example, if a small amount of a desirable aroma fraction is introduced in this way into the bag the second pressure may be less than about 200 millibars absolute, and preferably less than about 100 millibars absolute. In this case the resulting package is still a vacuum package. On the other hand, if the desired package is a soft, gas-flushed package, then sufficient inert gas (e.g. $CO_2$ or $N_2$ or a mixture thereof) can be bled back into the bag in this way so as to result in a second pressure of at least 800 millibars absolute up to atmospheric pressure, or even a few millibars above (e.g. from about 5 to about 30 millibars above) atmospheric pressure. In this way the contents of the package can be maintained in an inert gas atmosphere and are protected from any deleterious effects of air (e.g. oxidation by $O_2$).

The evacuation and sealing head assembly may be used as a stand alone item of equipment. Alternatively it may be mounted on a rotatable carousel arranged for rotation about a substantially vertical axis and provided with a plurality of stationary cam tracks; movement of the upper jaw members, of the lower jaw members, and of the sealing members between their respective open and closed positions is in this case effected by means of cam followers cooperating with the stationary cam tracks and connected to respective operating rods. Typically a plurality of evacuation and sealing head assemblies, for example, at least 30 evacuation and sealing head assemblies are mounted on the carousel. Yet again it is possible for a plurality of evacuation and sealing head assemblies to be mounted on a conveyor system and conveyed along a path of any desired shape, e.g. an oval path. The various steps of the method of the invention including opening and closing of the upper jaw members, of the lower jaw members and of the sealing members, as well as extension and retraction of the probe and operation of a valve or valves controlling the evacuation step, can be accomplished using pneumatic cylinders. Alternatively, when the evacuation and sealing head assembly is mounted on a carousel or on a moving conveyor, the appropriate movements can be achieved by means of push rods provided with cam followers acting upon appropriate cam tracks mounted on one or both sides of the path of movement of the evacuation and sealing head assembly. When cam tracks are arranged on one side only of the path of movement of the evacuation and sealing head assembly opening and closing movement of the upper jaw members, the sealing members and/or the lower jaw members can be achieved by connecting one of the respective members to an operating rod carrying the respective cam follower and provided with a rack and the other of the respective members to another rod also provided with a rack and arranged to cooperate with a pinion in engagement with the rack on the respective operating rod.

If the evacuation and sealing assembly further includes a pair of gusset-forming members, then they can be arranged so that movement of the gusset-forming members between their open and closed positions is effected by means of a corresponding cam follower cooperating with a stationary cam track and connected to a respective main operating rod.

In one arrangement the gusset-forming members are mounted on respective pivotally mounted arms each fixed to a respective vertical axle for arcuate movement about a substantially vertical axis between their open and closed positions, the vertical axles each further carrying a respective pinion, and the respective operating rod is provided with a pair of rack portions each of which cooperates with a corresponding Pinion on one of the vertical axles.

In addition it can be arranged so that one of the upper jaw members is connected to its respective main operating rod, while the other upper jaw is attached to a pair of subsidiary operating rods and the vertical axles each carry a further loose pinion which cooperates with a respective rack portion on the main operating rod for the upper jaw members and with rack portions on those subsidiary operating rods, whereby movement of the main operating rod for the upper jaw members in one direction causes the upper jaw members to move towards their closed position and movement of that main operating rod in the opposite direction causes the upper jaw members to move towards their open position.

Also one of the lower jaw members can be connected to its respective main operating rod, while the other lower jaw is attached to a pair of subsidiary operating rods and the vertical axles each carry a further loose pinion which cooperates with a respective rack portion on the main operating rod for the lower jaw members and with rack portions on those subsidiary operating rods, whereby movement of the main operating rod for the lower jaw members in one direction causes the lower jaw members to move towards their closed position and movement of that main operating rod in the opposite direction causes the lower jaw members to move towards their open position.

Furthermore one of the sealing members can be connected to its respective main operating rod, while the other sealing member is attached to a pair of subsidiary operating rods and the vertical axles each carry a further loose pinion which cooperates with a respective rack portion on the main operating rod for the sealing members and with rack portions on those subsidiary operating rods, whereby movement of the main operating rod for the sealing members in one direction causes the sealing members to move towards their closed position and movement of that main operating rod in the opposite direction causes the sealing members to move towards their open position.

Another preferred feature of the invention is that the bag is supported in an open topped container and the open topped container is provided with a cam follower which cooperates with a respective cam track to cause vertical movement of the open topped container and bag as required during the operating cycle. The open topped container is preferably moved by a conveyor in synchronism with the carousel.

The invention further provides apparatus for evacuating and sealing a bag containing a charge of a flowable product and formed from a sealable material so as to form a sealed package comprising:

an evacuation and sealing head assembly comprising:
  a substantially vertical sleeve around which an open upper end portion of a bag can be positioned, the bag containing a charge of a flowable product and formed from a sealable material;
  a substantially vertically retractable vacuum probe movable between an extended position in which its lower end extends below a lower end of the sleeve and a retracted position;
  means for moving the probe between its extended and retracted positions;
  a pair of upper jaw members movable towards each other to a closed position in which portions of the upper jaw members can grip an upper extremity of the bag against the sleeve to form an outer temporary seal and movable away from each other to an open position to release the upper extremity of the bag;
  means for moving the upper jaw members between their closed and open positions;
  a pair of lower jaw members below the upper jaw members and movable towards each other to a closed position in which portions of the lower jaw members grip a lower region of the bag against the vacuum probe in its extended position to form an inner temporary seal, the lower region being below the upper extremity of the bag and above the charge in the bag, and movable away from each other to an open position to release the lower region of the bag;
  means for moving the lower jaw members between their closed and open positions;
  a pair of sealing members movable towards each other, following retraction of the vacuum probe to its retracted position, to a closed sealing position in which the sealing members contact the outside of an intermediate region of the upper end of the bag extending across the entire width of the bag below its upper extremity and above the lower region to form a permanent seal extending across the intermediate region thereby to seal the bag so as to form a package and movable away from each other to an open position to release the sealed package; and
  means for moving the sealing members between their closed and open positions; and
vacuum means for evacuating the bag through the vacuum probe with the vacuum probe extended to its extended position through the sleeve into the bag into the space above the charge and with the upper jaw members closed against the sleeve to grip the upper extremity of the bag against the sleeve thereby to form an outer temporary seal.

In such an apparatus the upper jaw members can be arranged so that they commence to move towards their closed position prior to actuation of the vacuum means to cause evacuation of the bag.

In a preferred form of apparatus of the invention the evacuation and sealing head assembly further includes a pair of gusset-forming members movable in a direction substantially at right angles to the direction of movement of the upper jaw members between an open position and a closed position in which the gusset-forming members contact the outside surfaces of the bag and form gussets in the bag, the gusset-forming members being arranged to move from their open position and towards their closed position as the upper jaw members move towards their closed position, and the gusset-forming members being arranged to move to their open position before inward movement of the sealing members to their closed position to form a permanent seal to the bag.

In such an apparatus the gusset-forming members can be mounted on pivotally mounted arms each for arcuate movement about a substantially vertical axis between their open and closed positions.

The apparatus preferably includes an open topped container for support of the bag which is movable to a vertical position in which the upper surface of the charge of comminuted or other flowable product in the bag lies at a first distance below the lower end of the sleeve corresponding to a position in which the upper surface of the charge of flowable product in the bag lies below the lower end of the hollow probe in its extended position and also to a raised position in which the upper surface of the charge of flowable product in the bag lies at a second distance below the lower end of the sleeve, the raised position being a position such that, when the hollow probe is moved to its extended position, the upper surface of this charge in the bag is in close proximity to the lower end of the hollow probe.

In the apparatus according to the invention the lower jaw members are arranged to be moved to their closed position prior to the sealing members being moved to their closed position. The lower jaw members can reach their closed position at the same time as, or after the upper jaw members reach their closed position.

It is desirable for the lower jaw members to be provided on their mutually facing surfaces with resilient pads which engage the lower region of the bag in their closed position and resiliently press the inner surfaces of the lower region of the bag against the hollow probe to form an inner temporary seal, while permitting withdrawal of the probe from its extended position to its retracted position prior to the sealing members reaching their closed position.

The hollow probe is preferably arranged to move from its retracted position to its extended position prior to the lower jaw members reaching their closed position.

In another of its aspects the invention provides apparatus for evacuating and sealing a bag containing a charge of a flowable product and formed from a sealable material so as to form a sealed package, comprising:
  (i) a vacuum probe member for evacuation of a bag whose open end is positioned around the probe member, which contains a charge of a flowable material and which is formed from a sealable material, said probe member comprising a part which is movable relative to the bag between a first position in which said part extends through the open end of the bag into the bag and a second position in which the part is retracted relative to the bag but still extends into the bag;
  (ii) vacuum connection means for connection of the vacuum probe to a vacuum pump means for evacuation to a first pressure of a bag positioned with its open end around the probe member, said vacuum connection means including a valve means allowing in an open condition of the valve means connection between the interior of the bag and the vacuum pump means and in a closed condition of the valve means causing isolation of the bag when at said first pressure from the vacuum pump means;
  (ii) means for opening and closing said valve means;
  (iv) means for effecting relative movement of the part between its first and second positions;
  (v) means for forming a temporary seal at the one end of the bag around the probe member;
  (vi) means for admitting a predetermined quantity of a compressible fluid to said probe member so that, when the valve means is in its closed condition with a bag around the probe member at the first pressure, a second pressure higher than the first pressure is thereby produced in said probe member and in the bag; and (vii) means for forming a permanent seal in the bag at the open end of the bag in a position between the charge and the probe member in said second position.

In such an apparatus said means for forming said temporary seal may comprise elements relatively movable towards and away from each other between open and closed positions which overlap in their closed positions the extremity of the opposed surfaces at the open end of the bag, so that said elements press said opposed surfaces against each other and around the probe member and seal against each other beyond said extremity. Furthermore the probe member can include a stationary part around which said temporary seal is formed, and a movable part which extends from said stationary part when the probe member is in said first position and is substantially retracted when the probe is in said second position. In addition the apparatus may include means for forming a further temporary seal at the open end of the bag around said probe member between the charge and the position of the permanent seal, said further temporary seal forming means being arranged so that said further temporary seal can be maintained until after completion of the permanent seal. Said means for forming said further temporary seal conveniently includes jaw members relatively movable towards and away from each other between open and closed positions and movable to their closed positions, after said further temporary seal has been formed and prior to completion of the permanent seal, so as to press against the bag in their closed positions and to cause the adjacent surface of the charge to be pressed into a desired shape by the bag material adjacent that held between said jaw members. It will normally be preferred in an apparatus in accordance with this aspect of the invention for the probe member to be arranged to extend in said first position to a position closely adjacent the surface of said charge. Moreover said valve means is preferably arranged so as to be maintained in closed condition so as to maintain the pressure in said probe member at a reduced value up to completion of said permanent seal, whereby ambient pressure acting on the outer part of said bag in the region of said probe member in said second position assists in maintaining the bag sealed.

The means for admitting a predetermined quantity of a compressible fluid to said probe member preferably comprises a valve means arranged for connection to a source of the compressible fluid, e.g. atmospheric air, an inert gas such as $N_2$, $CO_2$, or a mixture thereof, or a source of a desirable aroma fraction; this valve means is accordingly preferably provided with a valve member permitting, in one position of the valve member communication between the source of compressible fluid and an intermediate chamber and, in another position of the valve member, communication between the intermediate chamber and the interior of the probe member. In another aspect of the invention apparatus for evacuating and sealing a bag containing a charge of a flowable product and formed from a sealable material so as to form a sealed package, comprises:

(i) a vacuum probe member for evacuation of a bag whose open end is positioned around the probe member, which contains a charge of a flowable material and which is formed from a sealable material;

(ii) means for forming outer and inner spaced temporary seals at the open end of the bag and around said probe member in said first position;

(iii) means for evacuating the bag through the probe member;

(iv) means for causing relative movement of the bag and said probe member so that said probe member is retracted relative to the bag and extends into the bag to a second position in which said member extends through said outer temporary seal but not through said inner temporary seal; and (v) means for forming a permanent seal in the bag at the open end of the bag at an intermediate region between said outer and inner temporary seals and between the charge and the probe member in said second position; said apparatus being arranged whereby upon releasing the outer and inner temporary seals the bag is released following completion of the permanent seal.

In a still further aspect of the present invention there is provided apparatus for evacuating and sealing a bag containing a charge of a flowable product and formed from a sealable material so as to form a sealed package, comprising:

(i) a vacuum probe member for evacuation of a bag whose open end is positioned around the probe member, which contains a charge of a flowable material and which is formed from a sealable material, said probe member comprising a part which is movable relative to the bag between a first position in which said part extends through the open end of the bag into the bag and a second position in which the part is retracted relative to the bag but still extends into the bag;

(ii) means for forming an outer temporary seal at the open end of the bag around said probe member;

(iii) jaw members relatively movable between open and closed positions and arranged so that in their closed positions they press against the bag so as to form an inner temporary seal at the open end of the bag around said probe member in said first position, said further temporary inner seal being positioned between the charge and the outer temporary seal and spaced from the outer temporary seal;

(iv) means for causing relative movement of the bag and the jaw members after said inner temporary seal has been formed so as to cause the adjacent surface of the charge to be pressed into a desired shape by impingement of the bag material adjacent that held between the jaw members against the jaw members;

(v) means for evacuating the bag through the probe member;

(vi) means for causing relative movement of the bag and said probe member so that said probe member is retracted relative to the bag and extends into the bag to a second position while maintaining the outer and inner temporary seals; and (vii) means for forming a permanent seal at the open end of the bag in a position between the inner and outer temporary seals and between the surface of the charge and the probe member in its second position.

In this case the jaw members can have flat surfaces against which the adjacent surface of the charge is pressed by impingement of the bag material adjacent that held between the jaw members against the jaw members so as to assist in forming a squared sealed end to the sealed bag.

In order that the invention may be clearly understood and readily carried into effect, a preferred method of evacuating and sealing a bag containing a charge of a comminuted product and formed from a heat-sealable material so as to form an evacuated sealed package conducted according to the invention, and a modification thereof, as well as two forms of apparatus for carrying out such a method and its modification respectively, will now be described, by way of example only, with reference to the accompanying drawings, wherein:

FIG. 4 is a horizontal section on the line B—B of FIG. 3;

FIG. 8 is an enlarged view of part of FIG. 2;

FIGS. 9 to 16 illustrate various stages in the evacuation and formation of a sealed package from an open bag containing a charge of a comminuted material, such as roasted and ground coffee, and formed from a heat-sealable material;

FIG. 2D is an underside view of the assembly of FIGS. 17 to 19 showing the shape of the hollow probe and the sleeve in which this slides.

Figure 1:
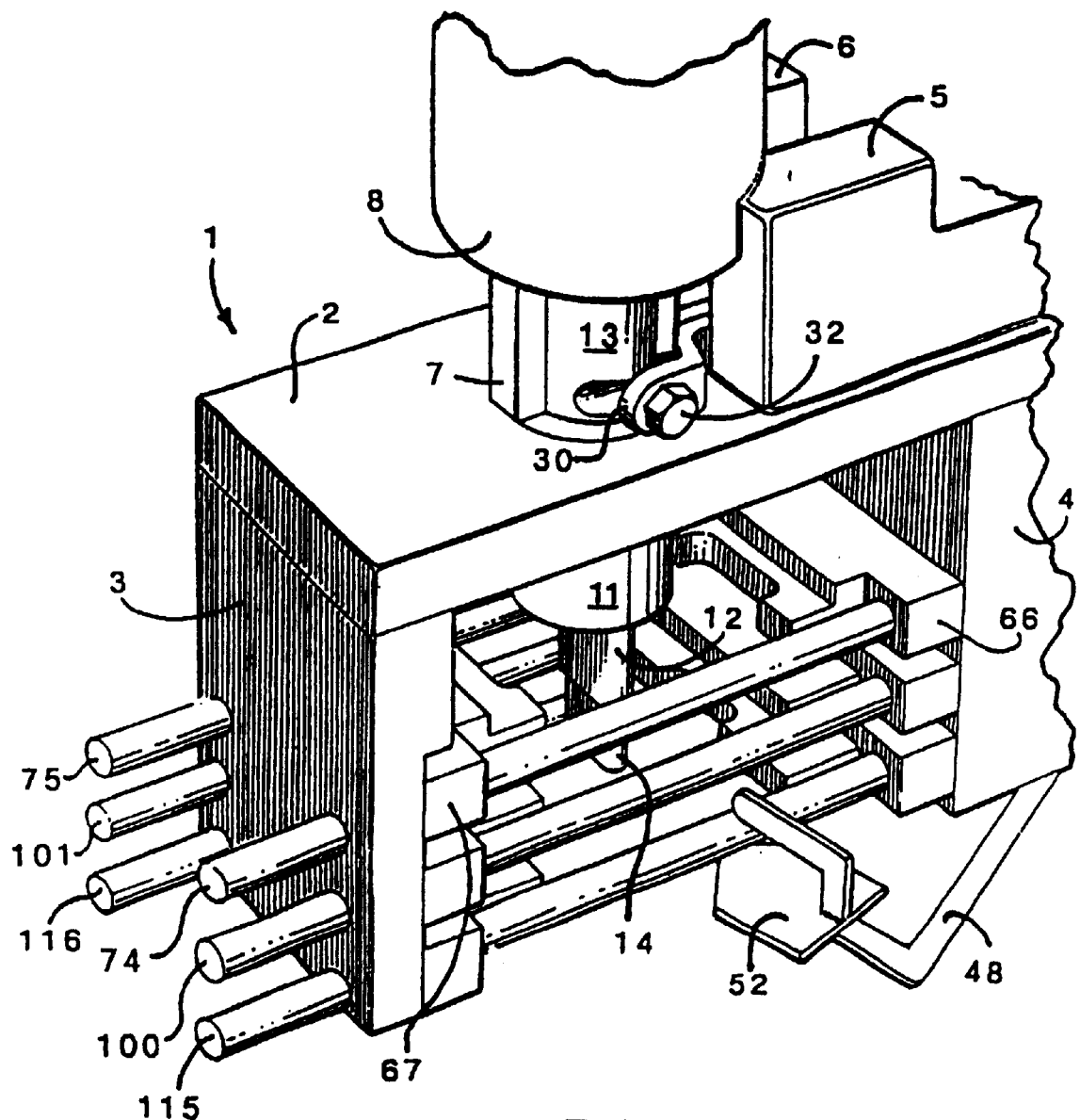
FIG. 1 is a perspective view of a vacuum and sealing head assembly of a machine for evacuating and sealing a bag containing a charge of a comminuted product and formed from a heat-sealable material so as to form an evacuated sealed package.

Referring to FIG. 1 of the drawings, reference numeral 1 indicates a vacuum and sealing head assembly of a machine for evacuating and sealing a bag containing a charge of a comminuted product and formed from a heat-sealable material so as to form an evacuated sealed package. Part only of the vacuum and sealing head assembly 1 is shown in FIG. 1. Assembly 1 is conveniently mounted on a carousel (not shown) which is arranged to rotate about a vertical axis and carries a number of assemblies (e.g 30 or more in total) identical to assembly 1.

Figure 2:
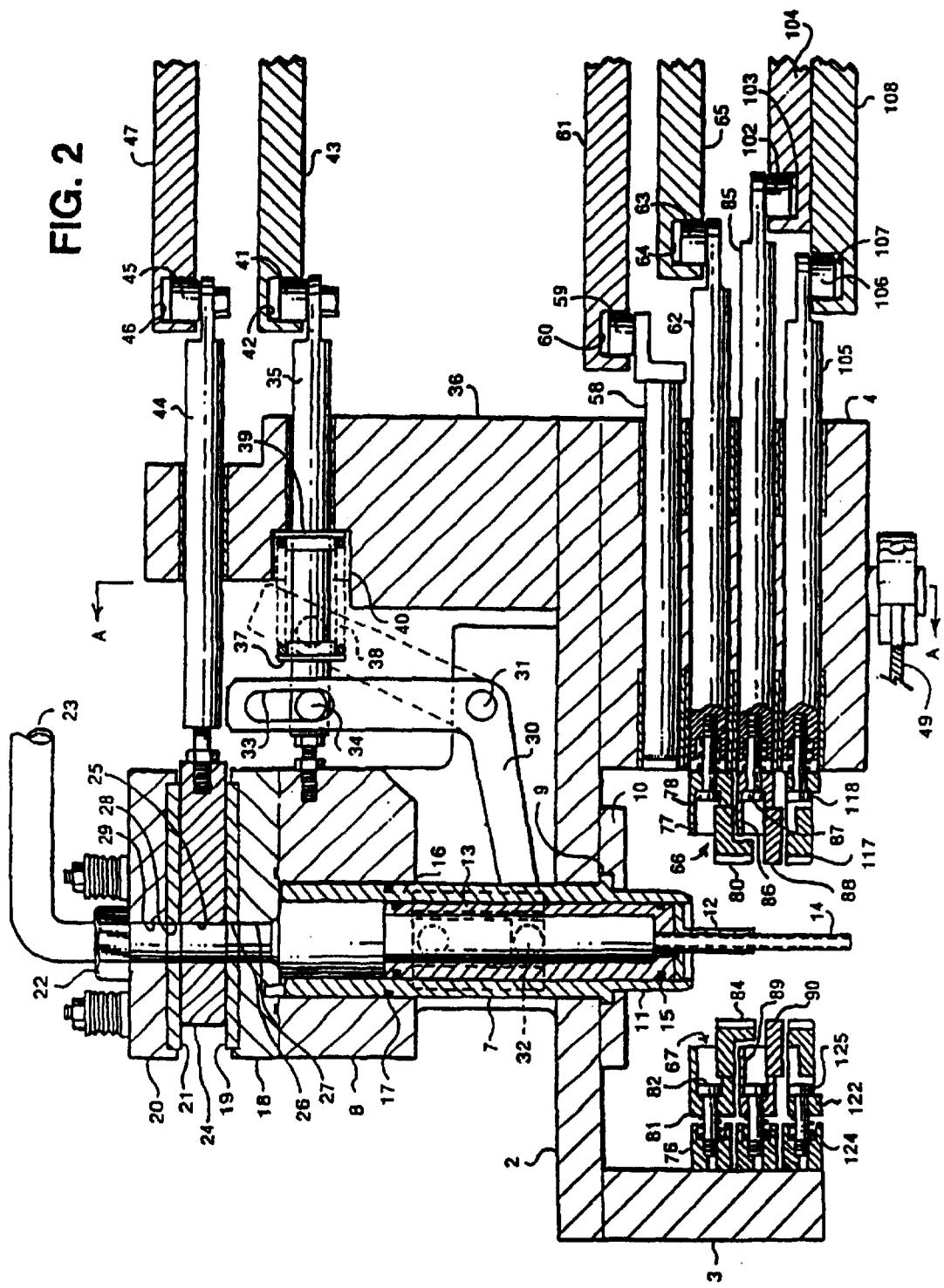
FIG. 2 is a vertical section through the vacuum and sealing head sealing assembly of FIG. 1.

Assembly 1 comprises a top member 2, first end member 3 and second end member 4 which together form a rigid frame of the assembly 1. Blocks 5 and 6 and tubular member 7 support a generally cylindrical body member 8. As can be seen in FIG. 2, tubular member 7 passes through top member 2 and has a peripheral flange 9 against which is secured a retainer plate 10 to hold it firmly in position. Screws (not shown in FIG. 2) secure retainer plate 10 to top member 2.

As can best be seen from FIG. 2, in the bottom end 11 of tubular member 7 there is mounted a sleeve 12 of generally elliptical section. An inner member 13 is snugly received within tubular member 7 and has a hollow probe 14 fitted at its lower end. Inner member 13 is slidable vertically within tubular member 7 and hollow probe 14 is likewise slidably mounted within sleeve 12.

Reference numeral 15 indicates a gasket at the lower end of inner member 13; gasket 15 is received within an external circumferential groove on inner member 13. A similar gasket 16 is received in a corresponding external circumferential groove at the top end of inner member 13. A further gasket 17 is fitted in a corresponding circumferential groove on the outside of tubular member 7. Gaskets 15 and 16 provide sealing between inner member 13 and tubular member 7, while gasket 17 provides a seal between tubular member 7 and body member 8.

Body member 8 is capped by a lower valve body member 18 of a vacuum operating valve, in whose upper surface is mounted a lower bearing block 19. Spaced above lower valve member 18 is an upper valve body member 20, in whose under face is mounted an upper bearing block 21. In the top of upper valve body member 20 there is a connection 22 to a vacuum line 23 leading to a vacuum pump (not shown). A slide member 24 having a bore 25 is slidably mounted between the lower bearing block 19 and upper bearing block 21. Upon alignment of bore 25 with corresponding bores 26 and 27 in the lower bearing block 19 and the lower valve body member 18 respectively and with corresponding bores 28 and 29 in the upper bearing block 21 and upper valve body member 20 respectively, probe 14 can be put into connection with vacuum line 23, as shown in FIG. 2.

Movement of inner member 13 is effected by means of a forked crank 30 which is journalled on a pivot pin 31. Each arm of the forked end of crank 30 carries an inwardly directed pin 32 which carries a track roller (not shown) that engages inner member 13. The forked nature of crank 30 is clearly apparent from FIG. 1, which also shows one of the pins 32. At its upper end, as can be seen from FIG. 2, crank 30 is provided with a slot 33, which receives a pin 34; pin 34 is attached to an actuating rod 35 which is slidably mounted in a rear block 36. Adjacent its front end actuating rod 35 carries a collar 37 which bears against one end of a compression spring 38, the other end of which bears against a washer 39 on actuating rod 35 to bias actuating rod 35 to its forward position, i.e. to the left as illustrated in FIG. 2. The rearward end of compression spring 38 and washer 39 are received in a recess in rear block 36. At its rearward end rod 35 is provided with a cam follower 41 which is received in a cam track 42 of stationary first cam 43. As the carousel rotates about its vertical axis so cam follower 41 moves inward and outward to move actuating rod 35 and to pivot crank 30 from the position shown in full lines in FIG. 2, in which probe 14 is extended, to the position indicated in broken lines, in which inner member 13 is raised to withdraw probe 14 substantially wholly within sleeve 12 and so is in its upward position.

Above actuating rod 35 a second operating rod 44 is slidably mounted in rear block 36; this carries at its rear end a cam follower 45 which runs in a cam track 46 of a second stationary cam 47. The forward end of operating rod 44 is connected to slide member 24 of the vacuum operating valve. As the carousel rotates about the vertical axis so operating rod 44 moves in and out to open and close the passageway through the vacuum operating valve formed by bores 25, 26, 27, 28, and 29 and thereby periodically apply vacuum to the probe 14 at the appropriate moments in the operating cycle.

Figure 3:
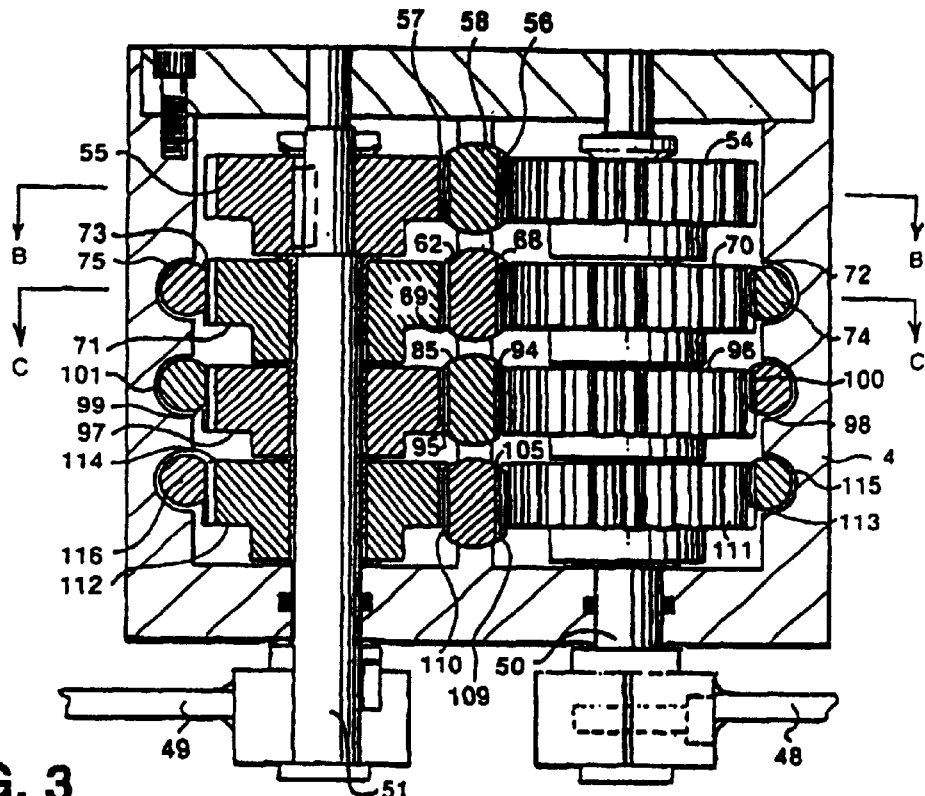
FIG. 3 is a vertical section on the line A—A of FIG. 2, of FIG. 4, or of FIG. 5.
Figure 7:
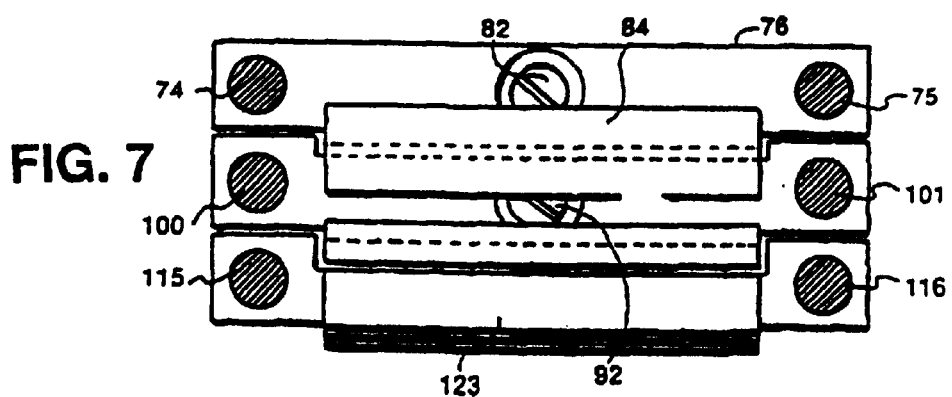
FIG. 7 is a vertical section of part of the assembly of FIG. 1 on the line E—E of FIG. 5.
Figure 6:
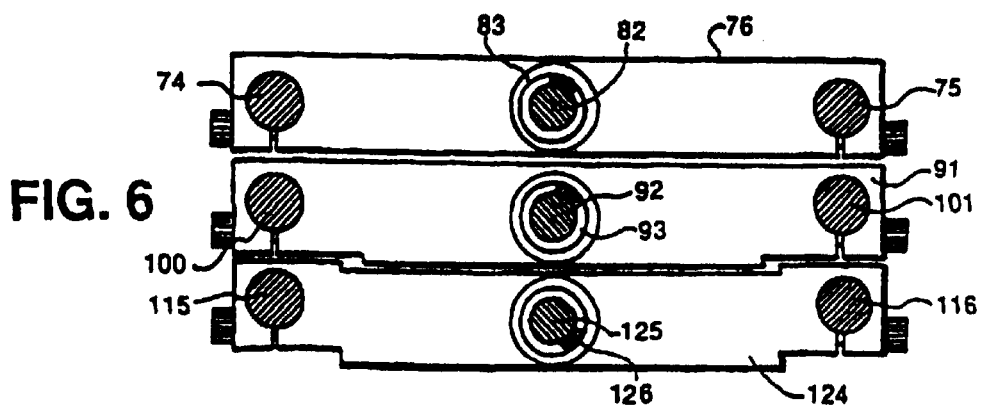
FIG. 6 is a vertical section of part of the assembly of FIG. 1 on the line D—D of FIG. 5.

A pair of arms 48, 49 are attached to axles 50, 51 which are vertically journalled in end member 4 as shown in FIG. 3. At their free ends arms 48, 49 carry respective gusset-forming members 52, 53. Cogs 54, 55 are affixed to axles 50, 51 and, as shown in FIG. 4, engage racks 56, 57 on an operating rod 58 which is slidable in member 4. Rod 58 carries a cam follower 59 at its rearward end (see FIG. 2); this cam follower 59 engages in a cam track 60 on a third stationary cam 61. (In order to simplify FIG. 2, rack 56 is not shown in this Figure). As the carousel rotates around its vertical axis, so cam follower 59 moves in and out, following cam track 60 on third cam 61, at the appropriate moments in the operating cycle to cause axles 50, 51 to rotate and move gusset-forming members 52, 53 into engagement, at the appropriate moment in the operating cycle, with the side walls of an open package (not shown in FIGS. 1 to 3) so as to form a gusset near the top end of the package, and then to move outward again.

Figure 5:
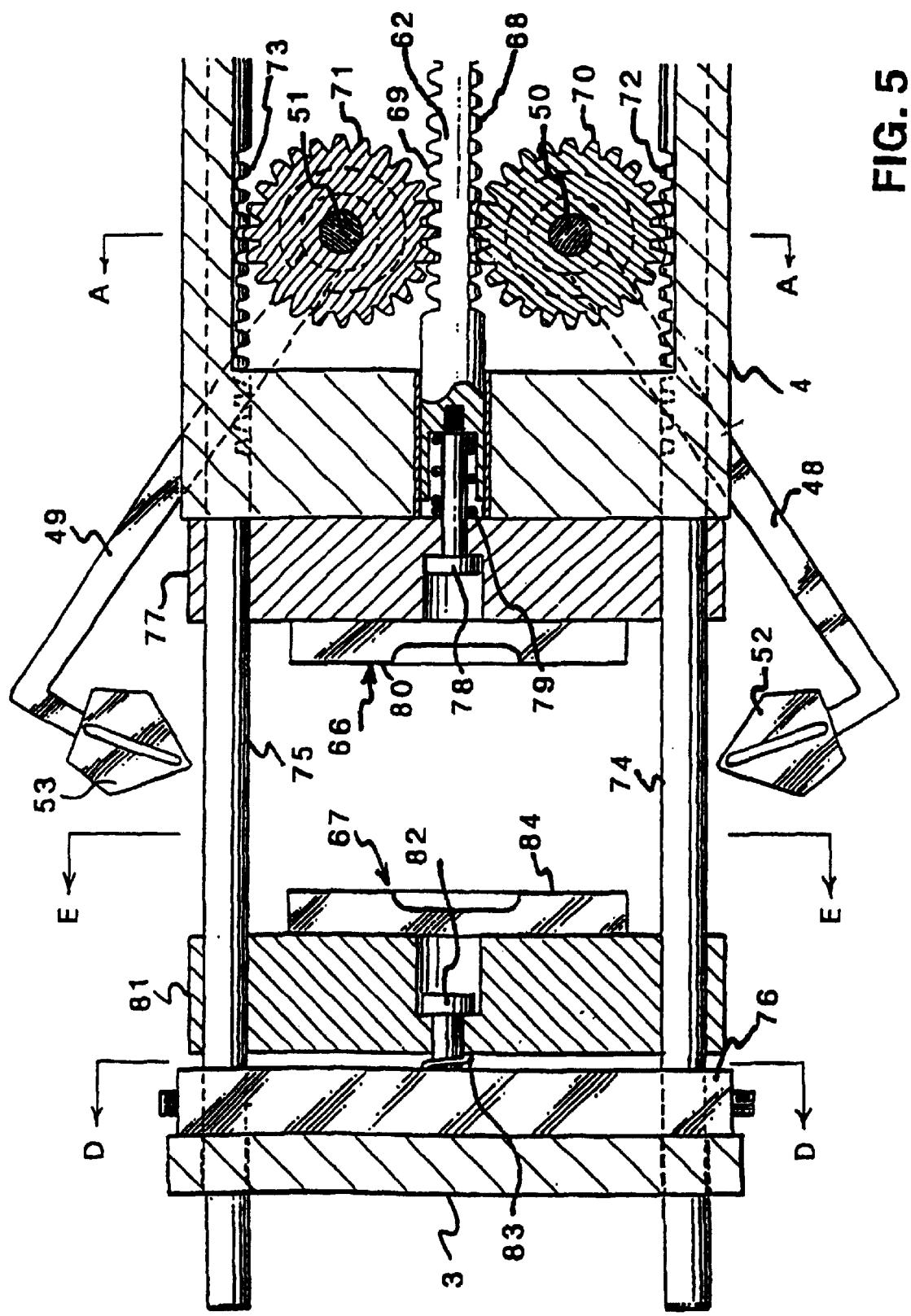
FIG. 5 is a horizontal section on the line C—C of FIG. 3.

Below operating rod 58 there is slidably mounted in member 4 a further operating rod 62 which carries at its rearward end a cam follower 63 running in a cam track 64 of a fourth stationary cam 65. Operating rod 62 operates a pair of upper gripping jaws, which are indicated generally at 66, 67 in FIGS. 1 and 2, by a mechanism which is shown in more detail in FIG. 5. A pair of racks 68, 69 are formed on operating rod 62; these engage with corresponding pinions 70, 71 loosely journalled on vertical axles 50, 51 respectively. Pinions 70, 71 in turn act upon racks 72, 73 on rods 74, 75 which are connected near their front ends (i.e. the left hand ends in FIGS. 1, 2 and 5) to a yoke 76 forming part of upper gripping jaw 67. Backing member 77 of upper gripping jaw 66 is attached to the front end of operating rod 62 by means of a pin 78 on whose shank is mounted a compression spring 79 (see FIG. 5) which biases backing member 77 in a forward direction, i.e. to the left as shown in FIG. 5. The backing member 77 can slide on rods 74, 75. When, as a result of cam follower 63 being pushed forwards (i.e. to the left in FIGS. 2 and 5), jaw 66 is moved forwards, the rack and pinion arrangements 68, 69, 70, 71, 72, and 73 cause corresponding backward movement (i.e. to the right in FIG. 5) of rods 74, 75, hence moving rods 74, 75 in the opposite direction to operating rod 62 and causing upper gripping jaws 66 and 67 to close.

Referring to FIG. 5, backing member 77 of upper gripping jaw 66 carries jaw plate 80. A similar backing member 81 is similarly captively mounted on the rearward side of yoke 76 by means of a pin 82 and a compression spring 83 and carries a jaw plate 84. Jaw plates 80 and 84 comprise respective pressure pads made from, or faced with, resilient material such as a rubber or resilient closed cell polyurethane foam. These resilient pads measure about 25 mm from top to bottom of their mutually contacting surfaces.

FIGS. 2, 4 and 5 illustrate upper gripping jaws 66 and 67 in their open position; in their closed position they are designed to contact opposed portions of an upper extremity of a bag placed between them and hold them against the outside of sleeve 12.

Below operating rod 62 there is slidably mounted in block 4 a further operating rod 85. This carries at its forward end a carrier plate 86 which is retained by a pin 87 similar to pin 78 and biased forwardly, i.e. to the left as shown in FIG. 2, by a compression spring (not shown) similar to compression spring 79. A heatable sealing jaw 88 is mounted on carrier plate 86. Heatable sealing jaw 88 is of conventional construction and is provided with internal electrical heating elements (not shown) and with a thermostatic regulating device (not shown) so as to maintain a predetermined sealing temperature of jaw 88 during the sealing step.

Facing carrier plate 86 and below backing member 81 is a further backing member 89 for a second heating jaw 90 which is of essentially identical construction to sealing jaw 88. Backing member 89 is resiliently connected to a yoke 91 by means of a screw 92. A compression spring 93 on the shank of screw 92 resiliently biases carrier plate 89 away from yoke 91.

Operating rod 85 is also provided with racks (indicated at 94, 95 in FIG. 3), similar to racks 68, 69, which engage with pinions 96, 97 loosely journalled on vertical axles 50, 51. Pinions 96, 97 also engage with racks 98, 99 which are provided on rods 100, 101. Rods 100, 101 operate in a similar way to rods 74, 75; hence forward movement of operating rod 85 under the influence of cam follower 102 moving against cam track 103 on stationary cam plate 104 causes forward movement (i.e. leftward movement as shown in FIGS. 2, 4 and 8) of sealing jaw 88 and rearward movement (i.e. rightward movement as shown in FIGS. 2, 4 and 8) of sealing jaw 90. In the closed position of sealing jaws 88 and 90 they are designed to contact opposed portions of a intermediate region of the upper end of a bag placed under the assembly, which intermediate region is under the upper extremity of the bag.

There is a further operating rod 105 which is slidably mounted in block 4 underneath operating rod 85. This carries at its rearward end a cam follower 106 which runs in a cam track 107 in a stationary cam plate 108. It also has two racks 109, 110 formed thereon which engage with pinions 111, 112 which rotate freely on vertical axles 50, 51. Pinions 111, 112 in turn engage with racks 113, 114 on rods 115, 116. To the front end of operating rod 105 is resiliently attached a backing plate 117; this is located by means of a screw 118 on whose shank is positioned a compression spring 119. A resilient pad 120 faced with rubber or a closed cell flexible polyurethane foam is mounted on backing plate 117; this is attached to backing plate 117 by means of screw 121. Facing backing plate 117 is a second similar backing plate 122 with a resilient pad 123, similar to pad 120. Backing plate 122 is resiliently mounted on a rigid carrier member 124 by means of screw 125 and compression spring 126. Pads 120 and 123 form a lower pair of gripping jaws which are designed to grip resiliently opposed portions of a lower region of a bag appropriately positioned under assembly 1, which lower region is under the intermediate region adjacent to heating and sealing jaws 88 and 90 but above the top of a charge of a comminuted product, such as roasted and ground coffee, in the bag. In their closed positions pads 120 and 123 of the lower gripping jaws may press the afore-mentioned lower region of the bag against probe 14; however, they allow probe 14 to be retracted while still in their closed positions. As cam follower 106 moves forwards and backwards in cam track 107 due to rotation of the carousel around the periphery of the stationary cam plate 108, so the arrangement of racks and rods causes the lower gripping jaws to open and close in dependence upon the instantaneous radial position of the cam follower 106 with respect to the vertical axis of rotation of the carousel.

As can be seen from FIG. 8, probe 14 has an open lower end which is desirably covered with a piece of perforated sheet fine wire gauze 127; this should be chosen so that the orifices therein are of a similar order of magnitude to the size of the majority of the particles of the comminuted product to be packaged. In this way the risk of particulate material being drawn into the vacuum system is minimised, while ensuring that the end of hollow probe 14 does not become so blocked with coffee or particles of another comminuted material that evacuation of the bag is unduly hindered. When the comminuted product to be packaged is roasted and ground coffee the wire gauze may have, for example, from about 100 to about 120 wires per inch (about 39 to about 47 wires per cm), corresponding to a gauze aperture size of from about 0.1 mm to about 0.5 mm. If a perforated sheet is used the apertures therein can, for example, take the form of slots; suitable dimensions such slot-shaped apertures, when the comminuted material is roasted and ground coffee, is about 5 mm long and about 0.35 mm wide.

In FIG. 8 there can also be seen a small bore 128 which is drilled through the bottom of inner member 13. Beneath its lower end is a somewhat larger blind bore 129 in end piece 130; this larger bore 129 contains a rubber pad 131 which serves to seal bore 128 at certain stages during the sequence of operation. Also visible in FIG. 8 is one of the screws 132 that holds retainer plate 10 in place.

The method of operation of assembly 1 will now be further explained with reference to FIGS. 9 to 16. These Figures have been simplified in order to make the sequence of operation easier for the reader to follow. In FIGS. 9 to 16 the various operating rods, cam followers, cam plates, rack and pinion drives and the like have been omitted. In addition upper gripping jaws 66, 67 and their carriers are each represented in simplified fashion as a unitary block; these blocks are designated UJ in FIGS. 9 to 16. Similarly the heating jaws 88, 90 and their carriers are shown as unitary blocks HJ. Also the resilient pads 120, 123 and their carriers, which form the lower gripping jaws of the assembly 1, are indicated at LJ.

Figure 9:
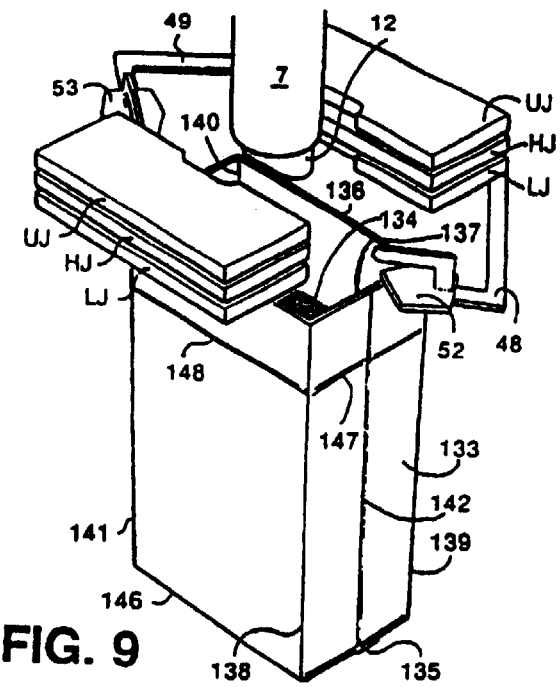

At the beginning of the evacuation and sealing of a bag 133 containing a charge 134 of a comminuted product, such as roasted and ground coffee, the bag 133 is carried within an open topped container or holder (not shown) with its upper end projecting from the top of the holder. The holder is itself carried by a conveyor belt moving in synchronism with the carousel (not shown) so as to be positioned directly under assembly 1 on the carousel during performance of the method of the invention. In the starting position of the method, shown in FIG. 9, bag 133 is under assembly 1 and the upper jaws UJ are open, as are also heating jaws HJ and lower jaws LJ. Gusset forming members 52, 53 are also in their open positions, as shown in FIG. 9.

Bag 133 is formed from a heat sealable plastics material, such as laminate reverse printed polyethylene terephthalate, low density polyethylene, and peelable low density polyethylene with an overall thickness of about 100 μm. The bag 133 is formed so that the peelable low density polyethylene is on the inside surface thereof. Bag 133 has a flat gusseted bottom with a bottom seal 135 as well as a longitudinal side seal 136. The general shape of the open bag 133 is that of a rectangular parallelepiped.

Figure 10:
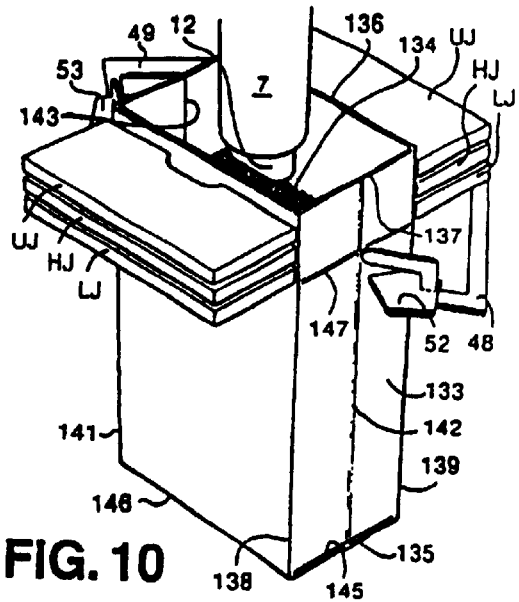

Next bag 133 in its open topped container or holder is raised, as shown in FIG. 10, so that the open upper end of bag 133 surrounds sleeve and lies between upper jaws UJ, heating jaws HJ and lower jaws LJ while the upper surface of charge 134 is still a few centimeters below the lower end of sleeve 12. In addition the upper rim 137 of the bag 133 at this time lies at a height such that, when the upper gripping jaws UJ eventually close and thereby cause inward folding of the bag material over the charge 134, the upper rim 137 of bag 133 will, in the closed position of the upper gripping jaws UJ lie a few mm below, e.g. about 12.5 mm below, the upper edges of jaws UJ. Thus the upper rim 137 of bag 133 lies about half way down the jaws UJ in this position. In this way the risk of bag material becoming caught between the bottom end of tubular member 7 and the upper jaws UJ during the subsequent bag closure steps, and hence the risk of thereby spoiling the top end of the resulting sealed package, is obviated. Moreover, by positioning the upper rim 137 below the upper edges of jaws UJ, the parts of the pressure pads of jaw plates 80 and 84 above the upper rim 137 contact one another and form an outer temporary seal above the upper rim 137 before evacuation commences. By allowing rubber-to-rubber (or foam-to-foam) contact between the upper parts of the pressure pads on jaws UJ a better seal is obtained. In the raised position of the bag 133 the upper surface of the charge 134 lies below the lower end of the sleeve 12 at a height such that, when the hollow probe 14 is moved to its extended position, the upper surface of charge 134 is in close proximity to, or preferably in contact with, the lower end of the hollow probe 14. Furthermore, in the raised position of bag 133, when the lower jaw members LJ are closed, the upper surface of the charge 134 presses the material of the bag 133 against the underside of the lower jaw members LJ. In this way the coffee is prevented from lifting due to efflux of air as the vacuum is applied through hollow probe 14 to the inside of the bag 133. In addition the coffee in the bag is pressed against the lower side of lower jaws LJ through the bag material so that the top of the package, after evacuation, is given a neatly squared off appearance. Hence the evacuated package is given a neat parallelepipedal appearance.

Figure 11:
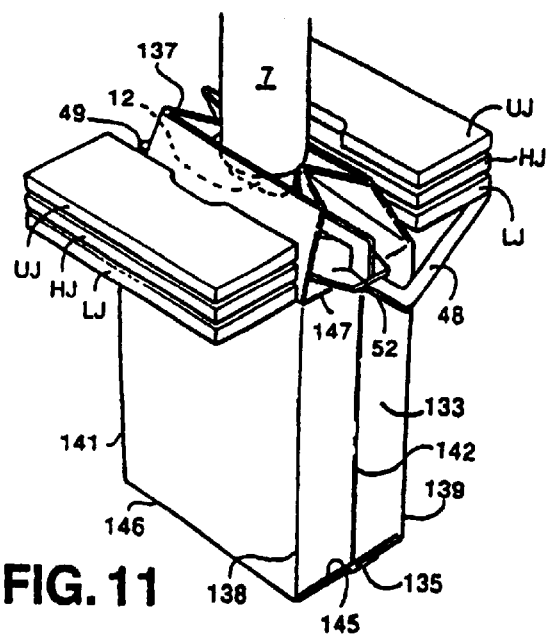

Operating rod 58 is then moved forward by its cam follower 59 as it follows stationary cam track 60 so as to cause gusset forming members 52, 53 to move inwards towards each other, thereby commencing to close the top of the bag 133 over the top of charge 134. At the end of this step the position will be as illustrated in FIG. 11.

Neat closure of the top of the bag 133 over the top of charge 134 and formation of a gusset can be facilitated if the bag 133 has been precreased during its formation along its vertical corners 138, 139, 140 and 141 and along the longitudinal lines 142, 143 where creases are required in order to form a gusset in the top of the package.

Figure 12:
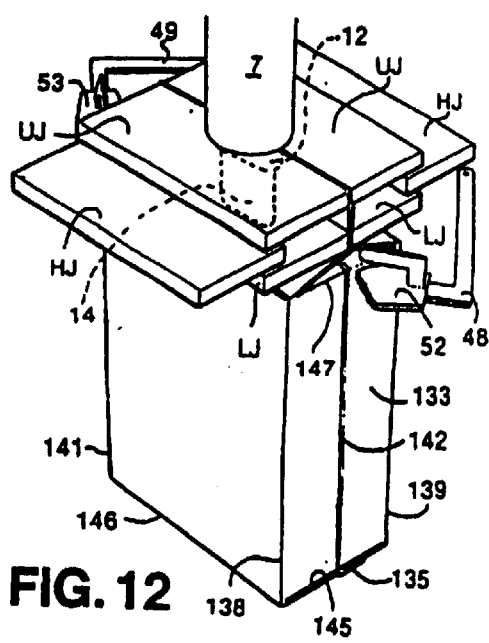

In the next step operating rod 35 moves forward so that vacuum probe 14 is extended to its lower extended position in which its lower end protrudes below the lower end of sleeve 12 into the top of bag 133, which is now gusseted, to a point which is about 10 mm to about 15 mm above the upper surface of charge 134. In this extended position of the end of bore 128, thereby preventing vacuum from being applied to the gap between probe 14 and sleeve 12. In addition operating rod 62 moves forward to cause the upper jaws UJ to close until they contact corresponding opposed portions of the outside of the bag 133 and hold these against the sleeve 12. Since the upper rim 137 of the bag 133 is about 12.5 mm below the top of upper jaws UJ, upper portions of the resilient pressure pads of jaw plates 80 and 84 contact one another to form an air-tight outer temporary seal above the bag 133. Operating rod 105 also moves forward thereby causing the lower jaws LJ also to close so that they hold closed a lower region of the bag 133 below the upper extremity of the bag 133 but above the upper surface of charge 134 and so form an inner temporary seal. Simultaneously operating rod 58 is withdrawn rearwardly so that gusset forming members 52 and 53 are withdrawn. The situation is now as illustrated in FIG. 12.

The bag 133 in its holder is now raised until the bottom end of vacuum probe 14 and the gauze or perforated sheet 127 are in contact with or just above, e.g. not more than about 1 mm to about 2 mm above, the upper surface of the charge 134. FIG. 13 shows the position at this stage operating rod 44 is moved forward to the position illustrated in FIG. 2 to connect vacuum line 23 to vacuum probe 14 via tubular member 7. Vacuum is thus applied to the interior of the bag 133. In a typical evacuation procedure a vacuum of about 950 millibars is applied in bag 133 (corresponding to an absolute pressure within bag 133 of about 50 millibars absolute, assuming the atmospheric pressure is about 1 bar).

Because the gauze or perforated sheet 127 is positioned so close to the upper surface of the charge 134 of coffee in bag 133, any coffee in the top surface portion of the charge 134 that is disturbed by air effluxing from the interior of the charge 134 during evacuation of bag 133 does not acquire a high velocity. Hence blockage of the gauze or perforated sheet 127 by coffee grains and any problem caused by wholesale lifting of the coffee charge 134 are largely avoided.

After evacuation of bag 133 is complete slide member 24 can, if desired, be moved to cut off the connection between the interior of bag 133 and the vacuum line 23. A small amount of an inert gas, such as carbon dioxide or nitrogen, or a desirable coffee aroma fraction, can then be bled back through a port (not shown) into the interior of tubular member 7 and hence into the bag 133. Typically the vacuum in bag 133 falls slightly; thus if vacuum of about 950 millibars is applied to bag 133 initially (corresponding to an absolute pressure of about 50 millibars), the vacuum applied to the interior of bag 133 following bleed back may be about 920 millibars, corresponding to an absolute pressure of about 80 millibars. Besides introducing desirable materials, e.g. inert gas or aroma components, into bag 133 the use of bleed back helps to dislodge any coffee particles on the underside of gauze or perforated sheet 127 back into bag 133.

Whilst keeping upper jaws UJ and lower jaws LJ closed, hollow probe 14 is withdrawn. As inner member 13 begins to lift to withdraw probe 14, bore 128 becomes unsealed, because its lower end lifts from rubber pad 131, and inner member 13 can be raised without creating an even greater vacuum between inner member 13 and end piece 130 because the bore 128 now allows the pressure to equalise across the bottom end of inner member 13.

When hollow probe 14 has been fully withdrawn, the situation is then as illustrated in FIG. 14.

Heating jaws HJ then close under the influence of operating rod 85. The situation is then as shown in FIG. 15. The pressure exerted by heating jaws HJ, combined with the elevated temperature of the sealing faces thereof, causes the heat sealable inside surfaces of the bag to soften or melt sufficiently to form a reliable heat seal 144 for the finished package. During this sealing step, if bleed back has been used, the vacuum in probe 14 is higher (i.e. the absolute pressure is lower) than in the interior of bag 133. After a sufficient dwell time to allow the heat to penetrate sufficiently the four layers in the gusset region at the top of the bag 133 and to permit reliable formation of the heat seal, the connection to the vacuum line 23 can be reestablished by moving slide member 24 under the influence of operating rod 44 before heating jaws HJ reopen. Reestablishment of the full vacuum at this point in the operating cycle helps to hold the side walls of the bag together in the region of the still warm seal as heating jaws open, thus assisting in formation of a proper permanent seal. In addition operating rods 85, 62, and 105 move backwards (i.e. to the right as shown in FIG. 2) to cause the heating jaws HJ to open followed by upper jaws UJ and lower jaws LJ thereby to allow the sealed bag 133 to fall away as a completed package as shown in FIG. 16.

The carousel continues to turn and passes through a cleaning station at which an air blast and/or a brush can be used to clean any coffee grains still sticking to gauze or perforated sheet 127 prior to reaching the first station corresponding to FIG. 9 again.

In the method illustrated with reference to FIGS. 9 to 16 probe 14 is first extended at a moment between the stage of FIG. 11 and that of FIG. 12. It can be extended earlier than this. For example, it can already be lowered at the beginning of the sequence at the stage of FIG. 9.

In the illustrated evacuation and sealing head assembly the upper jaws UJ, heating jaws HJ, and lower jaws LJ and so forth are caused to move by means of a series of operating rods, racks and pinions by means of cam followers moving against cam tracks. If the assembly is to be used as a stand alone unit, then movement can alternatively be achieved by means of pneumatic pistons and cylinders. If the evacuation and sealing head assembly is to be movable, as for example by being mounted on a rotatable carousel or on a moving conveyor, then each upper jaw UJ, each heating jaw HJ, and each lower jaw LJ and so forth may be moved, instead of by means of operating rods, racks and pinions, by an individual operating rod provided with a respective cam follower that cooperates with one of a pair of corresponding cam tracks mounted one on each side of the path of movement of the assembly.

In the procedure described above it is explained how the bag 133 can be evacuated and then a small amount of a desirable aroma fraction, or an inert gas (such as $CO_2$ or $N_2$) or air can be bled back into the bag 133 so as to reduce somewhat the vacuum within bag 133 prior to sealing. In this case the resulting package is still under vacuum but the vacuum in the finished package corresponds to a higher pressure (e.g. about 80 millibars absolute) compared to the highest vacuum (or lowest absolute pressure) produced in the bag 133 during the evacuation procedure (e.g. about 50 millibar absolute). Alternatively bleed back can be carried out using a larger amount of an inert gas (e.g. $CO_2$ or $N_2$) so that the resulting package is at or near atmospheric pressure, i.e. is a "soft" package whose contents are protected from any adverse effect of exposure to air (e.g. oxidation by $O_2$).

It has been mentioned above that neat closure of the top of the bag 133 over the top of charge 134 and formation of a gusset can be facilitated if the bag 133 has been pre-creased during its formation along its vertical corners 138, 139, 140 and 141 and along the longitudinal lines 142, 143. The neatness of closure can be still further improved by precreasing along horizontal lines, such as horizontal lines 145, 146, 147 and 148, corresponding to the eventual upper and lower edges of the completed package. Neatness of closure is particularly enhanced if such precreasing lines are provided in the regions where a gusset is to be formed in the package.

Figure 17:
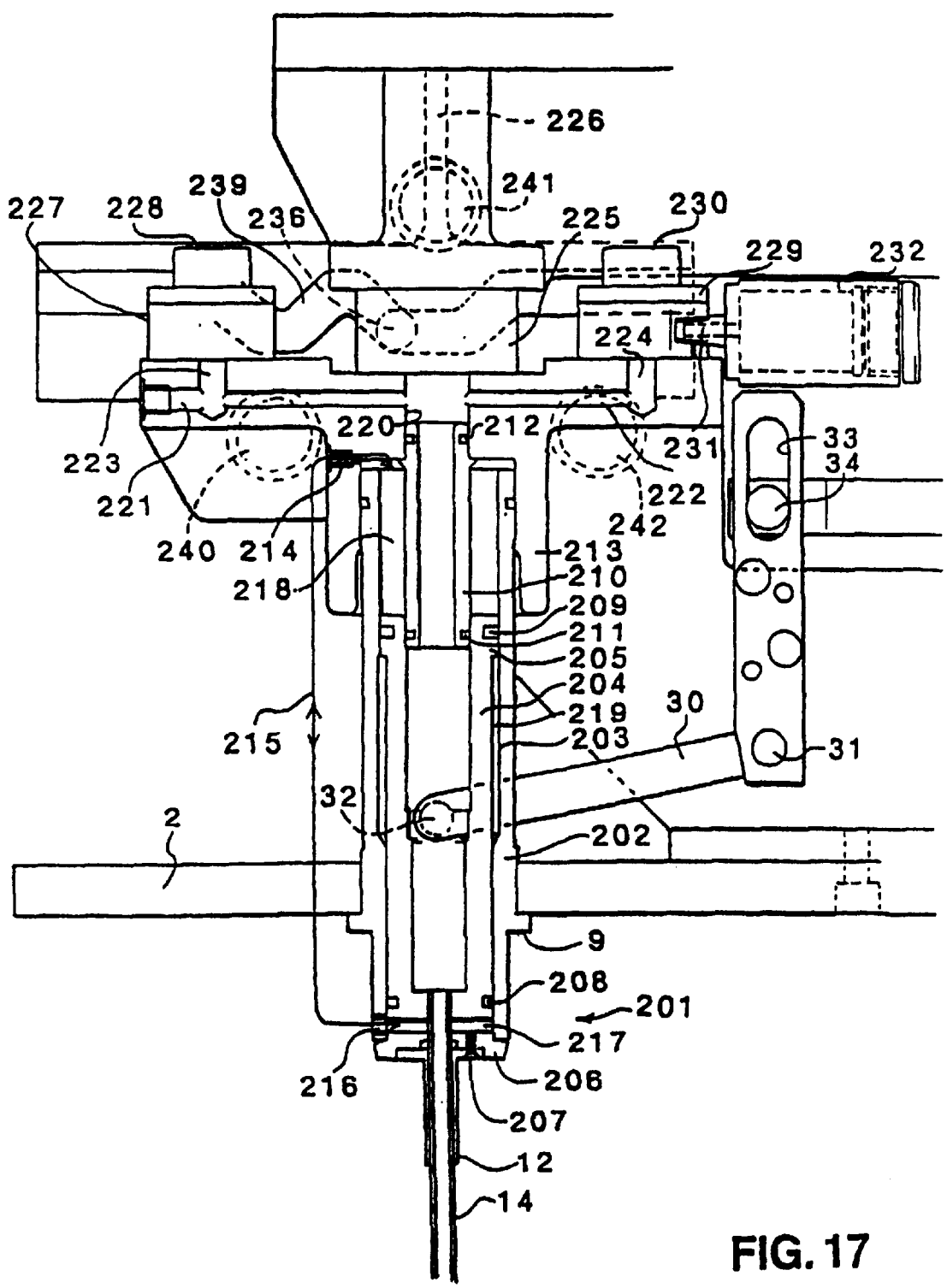
FIG. 17 is a vertical section through a further form of evacuation and sealing head assembly.
Figure 18:
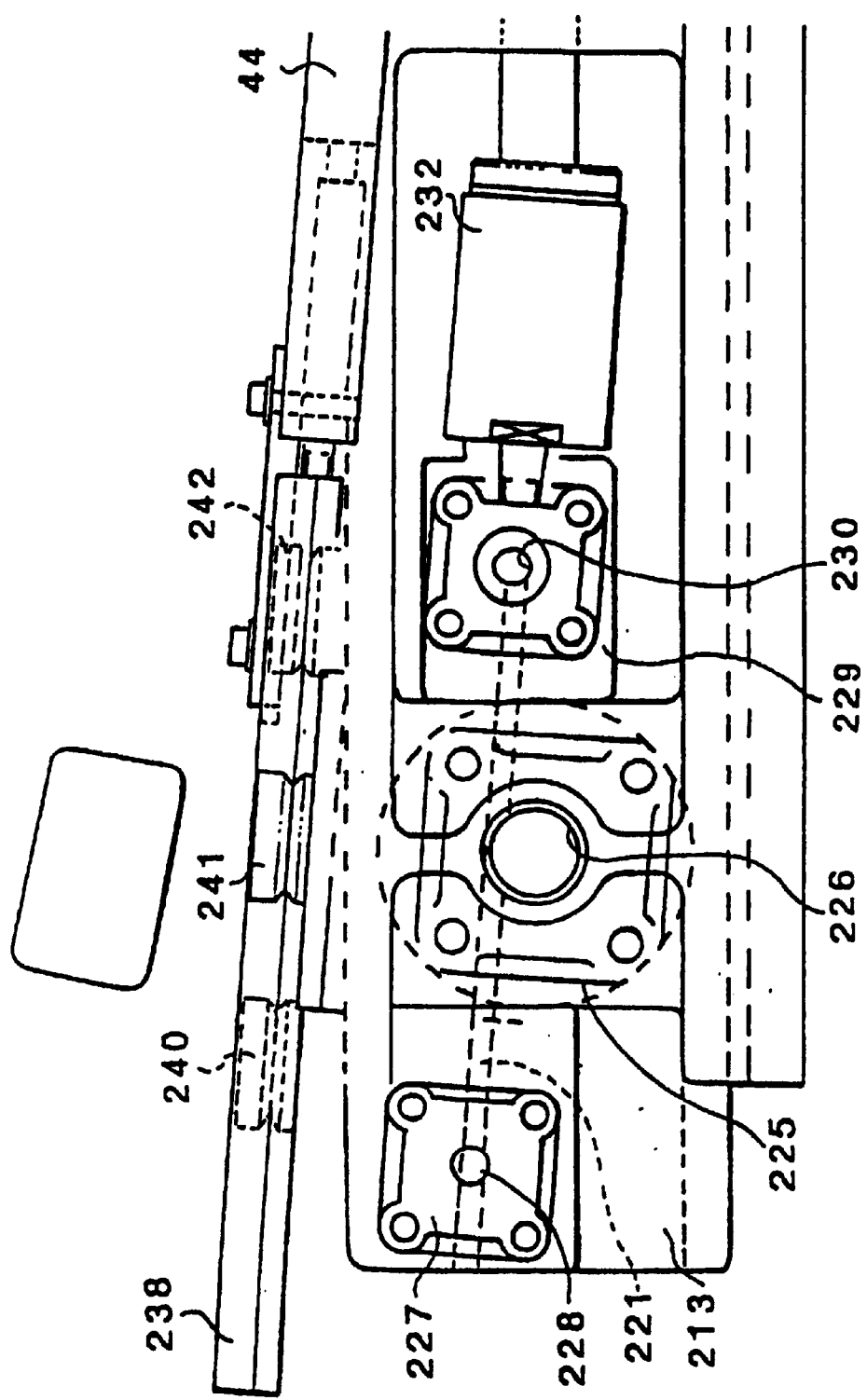
FIG. 18 is a top plan view of the head assembly of FIG. 17.

Referring to FIG. 17, this corresponds to the view of FIG. 2 and illustrates part of an alternative form of evacuation and sealing head assembly 201. Like assembly 1 of FIGS. 1 to 16, assembly 201 is conveniently mounted upon a carousel (not shown) which is arranged to rotate about a vertical axis and which carries a number of assemblies (e.g. 30 or more in total) each identical to assembly 201. Since many of the parts of assembly 201 are essentially identical to those of assembly 1 of FIGS. 1 to 16, identical reference numerals have been used in FIG. 17 to those used in FIGS. 1 to 16.

Assembly 201 comprises a top member 2 through which is passed a tubular member 202, which is similar to tubular member 7 of assembly 1 except that it has a portion 203 of somewhat enlarged internal diameter. Within tubular member 202 there is slidably mounted a hollow inner member 204 which has a piston 205 formed near its upper end. Hollow probe 14 is fixed to its lower end and is slidably received in a lower member 206 to which sleeve 12 is attached by means of screw 207. Hollow inner member 204 has an external lower seal 208 and an upper external seal 209. A tubular sleeve member 210 is received within the top of tubular member 202; this is a snug fit within hollow inner member 204. At its lower end tubular sleeve member 210 carries an external seal 211 and at its upper end it carries an external seal 212 by means of which a vacuum tight connection between tubular sleeve member 210 and top block 213 is made. Sleeve member 210 is fixed to top block 213.

At the top end of the annular cylinder formed by the top end of the enlarged bore of portion 203 and sleeve member 210 there is a port 214 which is connected by a line (indicated diagrammatically by line 215) to a corresponding port 216 at the lower end of tubular member 202. In this way the annular cylinder 217 below the lower end of tubular member 202 communicates at all times with the annular cylinder 218 above tubular member 202. Hence, when a vacuum is drawn through vacuum probe 14 to evacuate air from inside a bag 133 containing roasted and ground coffee, tubular member 202 can be raised to withdraw probe 14 from within bag 133 without further reducing the pressure in annular cylinder 217. The annular space 219 communicates with the outside air since this region of the assembly needs to allow for connection of the bifurcated arms of crank 30.

Top block 213 is provided with a vertical bore 220 and with horizontal bores 221 and 222 which communicate with blind bores 223 and 224 respectively. A rotating ball valve 225 is fitted above vertical bore 220 to permit connection to be made and broken between vertical bore 220 and vacuum line 226.

Valve 225 has a substantially spherical valve member (not shown) which is mounted within a substantially gas-tight housing on a horizontal spindle whose axis of rotation is substantially at right angles to the plane of the paper in FIG. 17 and has a polar bore therethrough at right angles to its axis of rotation. In one position of the valve member the bore can be aligned with bores 220 and 226 to provide a connection between vacuum line 226 and probe 14; by rotation of the valve member through an angle of approximately 90° from this position the connection between bores 220 and 226 can be broken, thus severing the connection between the vacuum line (via bore 226) and hollow probe 14.

A further rotating ball valve 227 controls connection between blind bore 223 and a source of compressed air (not shown) which is connected to a port 228 in the top of the body of valve 227; the purpose of the compressed air is to permit cleaning of the lower end of hollow probe 14 at the appropriate point in the operating cycle between completion of the sealing of one bag 133 and commencement of the sealing sequence for the next bag 133. Again the axis of rotation of the operating spindle of valve 227 is substantially at right angles to the plane of the paper of FIG. 17.

A third rotating ball valve 229 is provided for the purpose of bleeding back air (or a desirable coffee aroma fraction) into hollow probe 14 after the full vacuum has been drawn in the bag 133 for the purpose of dislodging particles of coffee from the lower end of hollow probe 14 prior to withdrawal of the probe 14 and closure of the sealing jaws HJ. This is of a generally similar design to that of valves 225 and 227 except that it has not only a port 230 in the top of the body of valve 229 which is either open to air or is connected to a source of a desirable coffee aroma fraction (not shown) but also a lateral port 231 which is connected to a chamber 232. The valve member (not shown) of valve 229 is also of a different design from that of valve 225 or 227; instead of having a straight bore it has a bore with an approximately 120° dog leg in it. This bore permits connection to be made between the open air (or a source of a desirable coffee aroma fraction) via port 230 and the interior of chamber 232, in one position of the valve member, and between the interior of chamber 232 and blind bore 222, in another position of the valve member of valve 229. However, direct connection between port 230 and blind bore 222 is not possible. This arrangement permits a predetermined volume of air (or desirable coffee aroma fraction) to be bled back into the interior of an evacuated bag 133, before it is sealed, via probe 14.

Figure 19:
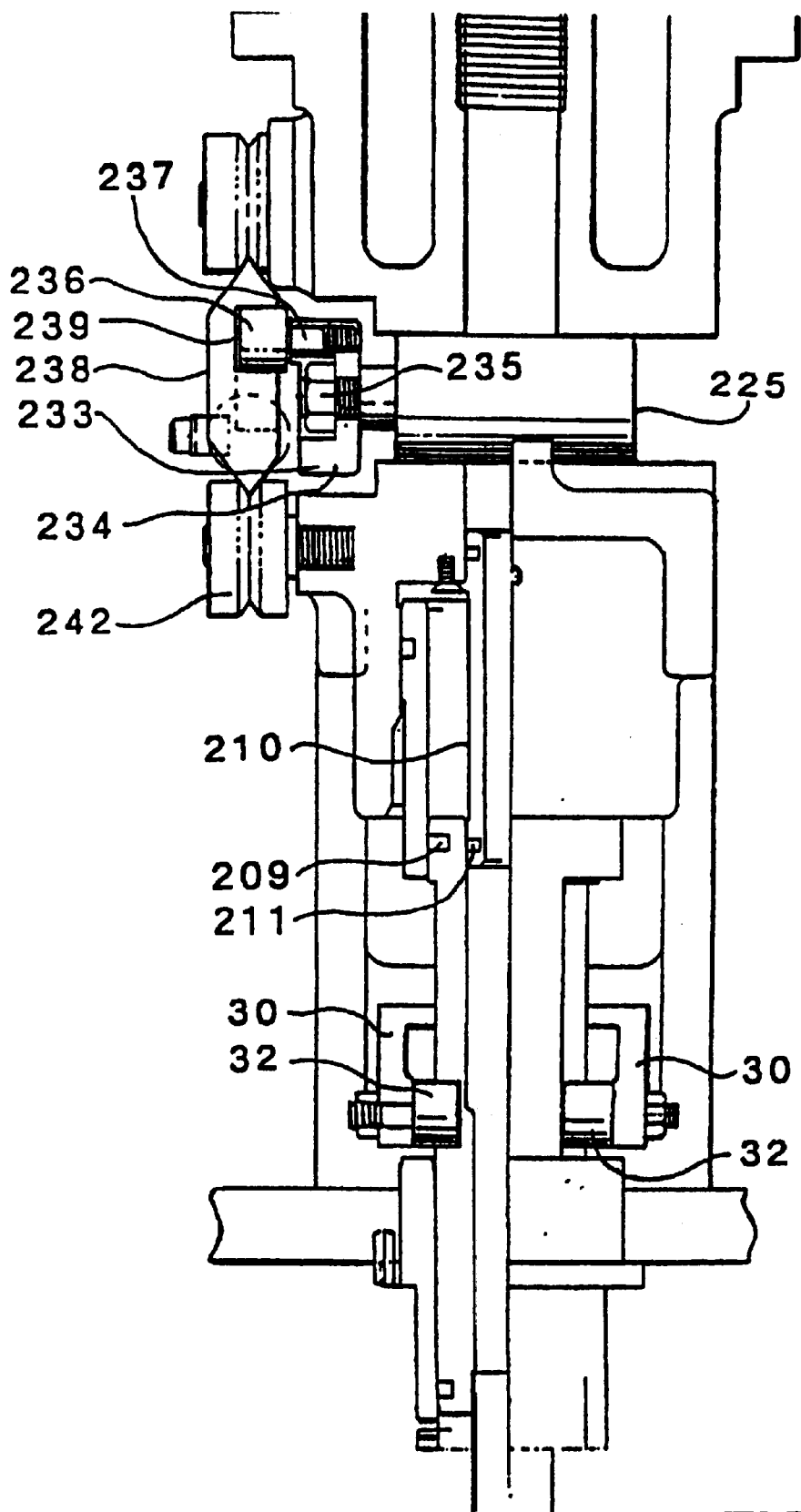
FIG. 19 is a vertical section on the line F—F of FIG. 18.

As can be seen from FIG. 19, the operating spindle 233 of valve 225 carries a collar 234, which is held in place by means of nut 235. Collar 234 carries an offset roller 236 mounted on a spindle 237.

Valves 227 and 229 carry similar collars (not shown) to collar 234 on their respective operating spindles and these collars each carry an offset roller similar to roller 236.

Operating rod 44 has a slide member 238 attached to its free end. This is formed with a groove 239 (see FIG. 17) and is constrained to move substantially inward and outward with respect to the axis of the carousel between rotatable rollers 240, 241 and 242. As operating rod 44 moves in and out under the influence of cam follower 45 running in cam track 46 of stationary cam 47 so slide member 238 also moves in and out towards and away from the axis of the carousel guided by rollers 240, 241 and 242. The shape of the groove 239, which acts as a cam track for roller 236 and the corresponding rollers for valves 227 and 229, causes such rollers to move vertically and hence to cause limited rotation of the operating spindles, including spindle 237, and thus of the valve members of all three valves 225, 227 and 229. By appropriate profiling of the cam track the valves 225, 227 and 229 can be made to operate in the desired sequence.

Figure 20:
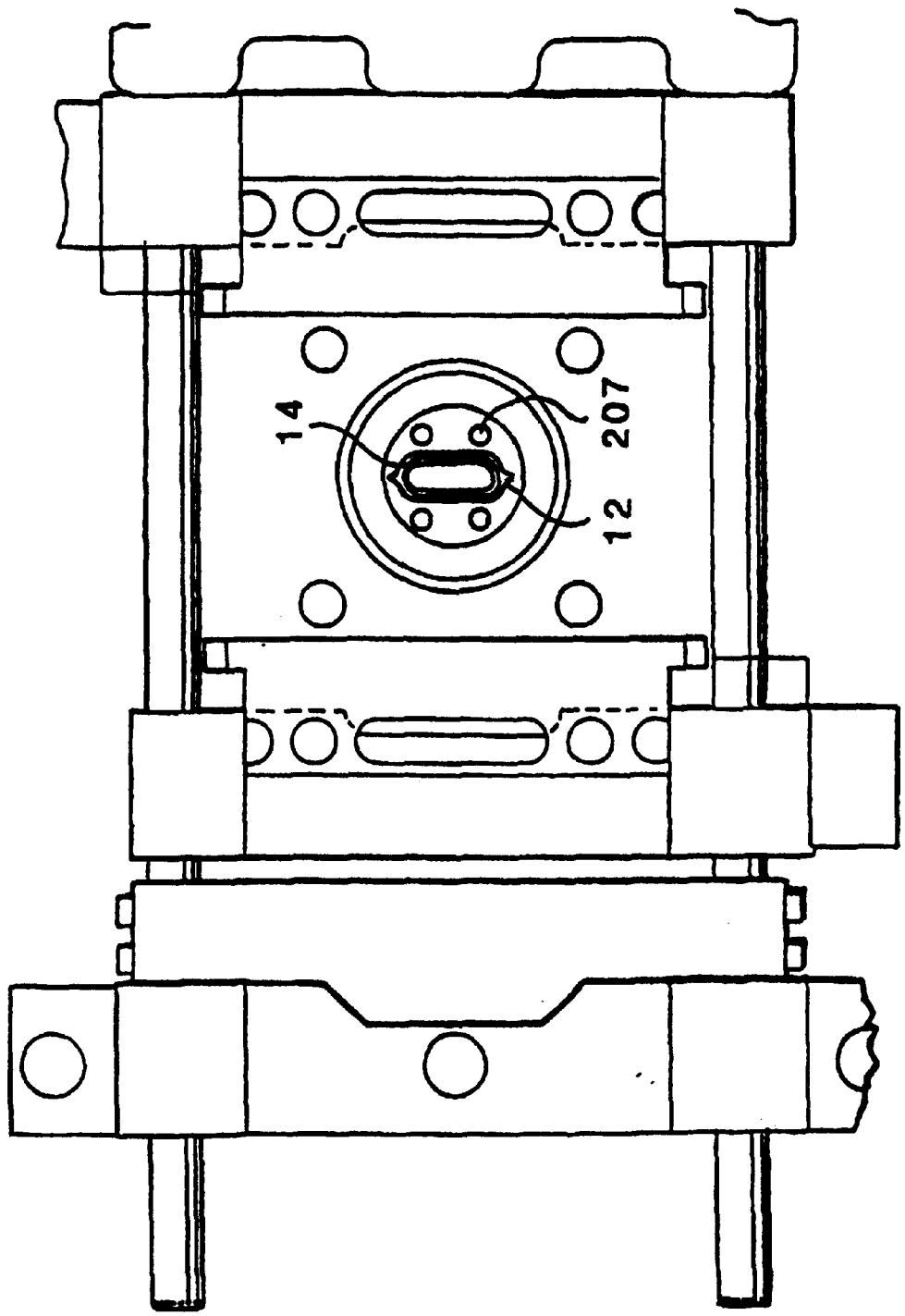

FIG. 20 shows the shape of hollow probe 14 and of sleeve 12 within which this slides. As can be seen from FIG. 20, the external profile in section of sleeve 12 is somewhat reminiscent of a pair of lips. This shape ensures that the material of the top end of the bag 133 is pressed as neatly as possible against sleeve 12 by the resilient pads 80 and 84 and that the risk of wrinkling of the bag material in this region is minimised. This in turn ensures that an optimum temporary seal is maintained above the seal area throughout the evacuation and sealing steps.

The sequence of movement of the jaws UJ, LJ and HJ is the same as that for assembly 1. Moreover the movement of operating rod 44 ensures that the valves 225, 227 and 229 open in the correct sequence, as described above in relation to assembly 1.

What is claimed is:

1. A method of evacuating and sealing a bag containing a charge of a flowable product and formed from a sealable material so as to form a sealed package, comprising the steps of:

(i) positioning a bag including an open end having an upper rim containing a charge of a flowable product and formed from a sealable material with its open end around a vacuum probe member and with said member extending into the bag to a first position;

(ii) forming outer and inner spaced temporary seals at the open end of the bag and around said probe member in said first position; said outer temporary seal being formed at the open end of the bag around said probe member, said inner temporary seal being formed at the open end of the bag around said probe member in said first position by pressing jaw members against the bag, said inner temporary seal being positioned between the charge and the outer temporary seal and spaced from the outer temporary seal;

(iii) evacuating the air contained in the bag through the probe member;

(iv) causing relative movement of the bag and said probe member so that said probe member is retracted relative to the bag and extends into the bag to a second position in which said member extends through said outer temporary seal but not through said inner temporary seal;

(v) forming a permanent seal in the bag at the open end of the bag at an intermediate region between said outer and inner temporary seals and between the charge and the probe member in said second position; and (vi) releasing the outer and inner temporary seals to allow release of the bag following completion of the permanent seal; and (viii) prior to step (iii), causing relative movement of the bag and the jaw members after said inner temporary seal has been formed so as to cause the adjacent surface of the charge to be pressed into a desired shape by impingement of the bag material adjacent that held between the jaw members against the jaw members.

2. A method according to claim 1, wherein the jaw member have flat surfaces against which the adjacent surface of the charge is pressed by impingement of the bag material adjacent that held between the jaw members against the jaw members so as to assist in forming a squared sealed end to the sealed bag.

3. A method as in claim 1, wherein said outer temporary seal is airtight.

4. A method according to claim 1, in which said outer temporary seal is formed by pressing elements which overlap the extremity of the opposed surfaces at the open end of the bag, so that said elements press said opposed surfaces against each other and around the probe member and seal against each other beyond said extremity.

5. A method according to claim 4, in which the pressing elements comprise upper jaw members that are each provided on their mutually facing inner faces with resilient pads extending across the width of the bag in which in step (i) the upper rim of the bag is postioned below the top of the resilient pads so that in the closed position of the upper jaw members portions of the resilient pads contact one another above the top of the upper rim to form an airtight seal above the bag while the lower portions of the resilient pads press the upper end of the bag against the vacuum probe member.

6. A method according to claim 1, in which the jaw members are provided on their mutually facing surfaces with resilient pads which engage the bag in their closed position and resiliently press the inner surfaces of the bag against the probe member while permitting withdrawal of the probe member from its first position to its spaced position prior to commencement of step (v).

7. A method according to claim 1, wherein the probe member includes a stationary part around which said outer temporary seal is formed, and a movable part which extends from said stationary part when the probe member is in said first position and is substantially retracted when the probe is in said second position.

8. A method according to claim 1, wherein the bag, after filling with a charge of flowable product, is subjected to vibration and/or tamping in order to compact the flowable product and to assist in importing a smooth top surface to said charge.

9. A method according to claim 1, in which the pressure in the resulting package is less than about 100 millibar absolute.

10. A method as claimed in claim 1, in which the probe member extends in the first position to a position closely adjacent the surface of the charge.

11. A method as claimed in claim 1, in which the pressure in the probe member is maintained at a reduced value up to completion of the permanent seal, whereby ambient pressure acting on the outer part of said bag in the region of the probe member in the second position assists in maintaining the bag sealed.

12. Apparatus for evacuating and sealing a bag containing a charge of a flowable product and formed from a sealable material so as to form a sealed package, comprising:
(i) a vacuum probe member for evacuation of a bag having an open end positioned around the probe member such that the probe member extends into the bag to a first position, which bag contains a charge of a flowable material and is formed from a sealable material;

(ii) means for forming outer and inner spaced temporary seals at the open end of the bag and around said probe member in said first position; said means including jaw members relatively movable between open and closed positions which are arranged so that in their closed positons they press against the bag so as to form said inner temporary seal at the open end of the bag around said probe member in said first position, and means for forming said outer temporary seal at the open end of the bag around said probe member; said inner temporary seal being positioned between the charge and the outer temporary seal and spaced from the outer temporary seal;

(iii) means for evacuating the bag through the probe member;

(iv) means for causing relative movement of the bag member and said probe member so that said probe member is retracted relative to the bag and extends into the bag to a second position in which said member extends through said outer temporary seal but not through said inner temporary seal;

(v) means for forming a permanent seal in the bag at the open end of the bag at an intermediate region between said outer and inner temporary seals and between the charge and the probe member in said second position; and (vi) means for causing relative movement of the bag and the jaw members after said inner temporary seal has been formed so as to cause the adjacent surface of the charge to be pressed into a desired shape by impingement of the bag material adjacent that held between the jaw members against the jaw members;

said apparatus being arranged whereby upon releasing the outer and inner temporary seals the bag is released following completion of the permanent seal.

13. Apparatus according to claim 12, wherein the jaw members have flat surfaces against which the adjacent surface of the charge is pressed by impingement of the bag material adjacent that held between the jaw members against the jaw members so as to assist in forming a squared sealed end to the sealed bag.

14. Apparatus according to claim 12, in which the jaw members are provided on their mutually facing surfaces with resilient pads which engage the open end of the bag in their closed position and resiliently press the inner surfaces of the material of the bag against the probe member to form an inner temporary seal, while permitting withdrawal of the probe from its first position to its second position.

15. Apparatus according to claim 12, wherein the probe member includes a stationary part around which said outer temporary seal is formed, and a movable part which extends from said stationary part when the probe member is in said first position and is substantially retracted when the probe is in said second position.

16. Apparatus according to claim 12, wherein said means for forming said outer temporary seal are adapted to form an airtight seal.

17. Apparatus according to claim 12, in which said means for forming said outer temporary seal comprise elements relatively movable towards and away from each other between open and closed positions which overlap, in their closed positions, the extremity of the opposed surfaces at the open end of the bag, so that said elements press said opposed surfaces against each other and around the probe member and seal against each other beyond said extremity.

18. Apparatus according to claim 17, further comprising a pair of gusset-forming members movable in a direction substantially at right angles to the direction of movement of the elements between an open position and a closed position in which the gusset-forming members contacts the outside surface of the bag and form gussets in the bag in which the gusset-forming members are arranged to move from their open position and towards their closed position as the elements move towards their closed position, and in which the gusset-forming members are moved to their open position before operation of the sealing means to form a permanent seal to the bag.

19. Apparatus according to claim 12, in which said means for evacuating the bag are adapted to maintain the pressure in said probe member at reduced value up to completion of said permanent seal, whereby ambient pressure acting on the outer part of said bag in the region of said probe member in said second position assists in maintaining the bag sealed.

20. Apparatus as claimed in claim 12, in which the probe member is arranged to extend in the first position to a position closely adjacent the surface of said charge.

* * * * *